United States Patent [19]
Horie et al.

[11] Patent Number: 5,157,692
[45] Date of Patent: Oct. 20, 1992

[54] SYSTEM FOR CONTROLLING COMMUNICATION BETWEEN PARALLEL COMPUTERS

[75] Inventors: Takeshi Horie, Kawasaki; Morio Ikesaka, Yokohama; Hiroaki Ishihata, Tokyo, all of Japan

[73] Assignee: Fujitsu Limited, Kawasaki, Japan

[21] Appl. No.: 495,987

[22] Filed: Mar. 20, 1990

[30] Foreign Application Priority Data

Mar. 20, 1989 [JP] Japan .................................. 1-068514

[51] Int. Cl.$^5$ .............................................. H04K 1/10
[52] U.S. Cl. .......................................... 375/38; 370/60
[58] Field of Search ........................... 375/36, 38, 121; 370/60, 86, 87, 88, 94, 89, 29, 85.12; 340/825.01, 825.05, 825.3

[56] References Cited

U.S. PATENT DOCUMENTS

| | | | |
|---|---|---|---|
| 4,345,326 | 8/1982 | Dieudonne et al. | 370/60 |
| 4,797,882 | 1/1989 | Maxemchuk | 370/94 |
| 4,933,933 | 6/1990 | Dally et al. | 370/60 |
| 5,008,882 | 4/1991 | Peterson et al. | 370/94.1 |

FOREIGN PATENT DOCUMENTS

0225022 6/1987 European Pat. Off. .
0304285 2/1989 European Pat. Off. .

OTHER PUBLICATIONS

International Publication WO88/08642 (Thinking Machine Corp).
Distributed Computing, vol. 1, No. 4, Oct. 1986, Berlin De, "The Torus Routing Chip", W. J. Dally and C. L. Seitz, pp. 187-196.
Proceedings IEEE International Conference on Computer Design, VLSI in Computers, ICCD '85, Oct. 7, 1985, "A Design Methodology for Concurrent VLSI Systems", T. A. Chu, pp. 407-410.

*Primary Examiner*—Stephen Chin
*Attorney, Agent, or Firm*—Staas & Halsey

[57] ABSTRACT

A communication control system controls communication between parallel computers using a wormhole routing. The system comprises units for connecting a plurality of computer nodes by relay channels within a network to continuously transfer a message divided into a plurality of minimum data units for transmission. Storing units are provided in respective nodes for storing the minimum data units, the number of storing units corresponding to the number of relay channels from the originating node to the most remote node plus 1. Therefore, a deadlock in a communication is avoided, and a high speed communication can be realized.

12 Claims, 27 Drawing Sheets

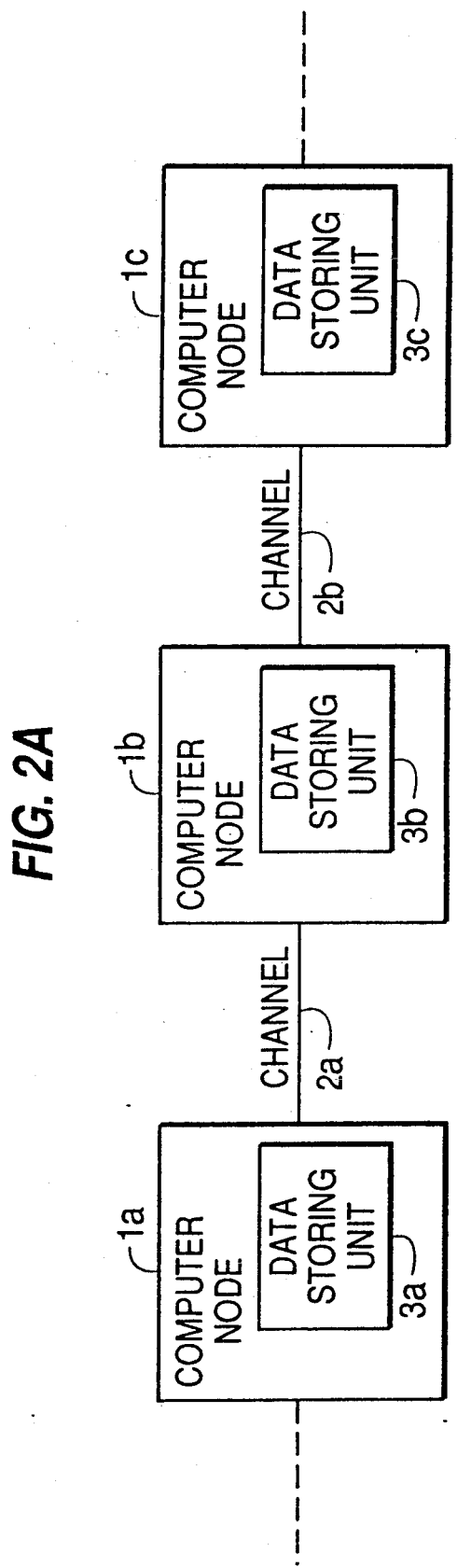

— CHANNEL e : END BIT clss : SENDING CLASS
ce : SENDING CLASS ENABLE
eclss : EMPTY CLASS
ece : EMPTY CLASS ENABLE
dis : DISTANCE DATA

FIG. 12A

| muxa_i_e | H | L | L |
|---|---|---|---|
| muxa_e | – | L | H |
| datas_d_e | dataw_i | FROM MEMORY | datarw_e |

FIG. 12B

| muxb_i_e | H | – | L | L | L | L |
|---|---|---|---|---|---|---|
| muxb_e | – | – | H | L | L | L |
| muxb-i-w | – | H | L | L | L | L |
| muxb_w | – | – | L | H | L | L |
| dir _ mo | – | – | H | L | H | L |
| OUTPUT SIGNAL | dataw_i | datarw_e | datarw_w | FROM MEMORY (EAST) | FROM MEMORY (WEST) |

SM1 STATE OF COUNTER 55
MANAGING THE NUMBER OF
DATA WITHIN THE BUFFER

SM2 STATE OF COUNTER 53
DESIGNATING THE DATA
DIRECTION WITHIN THE
BUFFER

FIG. 18C
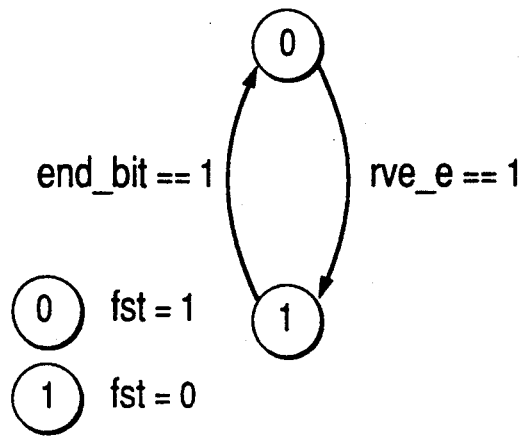
SM3 STATE OF COUNTER 54 SHOWING WHETHER OR NOT THE DATA IS HEADER DATA
FIG. 18D
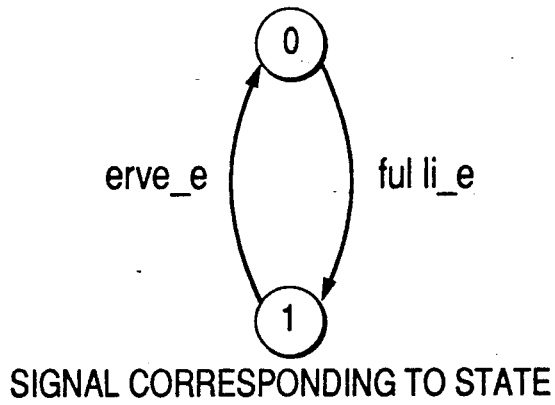
SIGNAL CORRESPONDING TO STATE
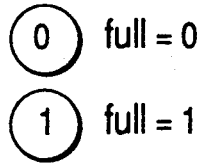
SM4 STATE OF COUNTER 56 DESIGNATING WHETHER OR NOT CLASS CORRESPONDING TO BUFFER WITHIN ADJACENT NODE IS FULL

SYSTEM FOR CONTROLLING COMMUNICATION BETWEEN PARALLEL COMPUTERS

BACKGROUND OF THE INVENTION

The present invention relates to a system for controlling communication between parallel computers in which a plurality of computer nodes is connected through a plurality of channels and more particularly to a system for controlling communication between parallel computers in which a plurality of computer nodes is connected in a 2-divisional lattice and a plurality of nodes exists in two division channels. One such communication control system is a packet system. This system is used, for example, to transmit a message from a node A to a node C through a node B. Node A transmits a packet to node B. Node B stores this packet and then transmits it to node C. Thus, a relay transmission is performed. In this system, called store and forward routing, the packet is stored in node B once, thus causing a large delay in transmission to node C.

A system for communicating between parallel computers, using a "wormhole routing" method, is known. In wormhole routing, the message is divided into minimum transfer units called flits, for example, several bytes of data. The first flit, namely, header flit is transferred within the network through a relay route between a transmitting node and a receiving node. When a certain node receives the header flit of the message, a channel (communication path) forming a relay route is selected by a transfer destination node designated by the header. The header flit and the following data flits are then transferred to the receiving node through the channel. The message is transferred in a form such that it continuously occupies the relay route from the transmitting node to the receiving node. That is, the message is transmitted on a channel in a chaining manner. Before the last flit of the message is output from the transmitting node, the header flit sometimes arrives at the receiving cell.

A flit other than the header flit does not contain routing information but a flit of the message is transferred on a continuous channel within the network, and is thus not interleaved by flits of other messages. When the header flit of the message is blocked, transfer of all the flits of the message is stopped and transfer of other messages requiring the same channel being used for the message transfer is also blocked.

When wormhole routing is used in a network in which a plurality of nodes is connected in a torus manner, it is necessary to avoid a deadlock state in which transfer of the all messages is blocked.

FIG. 1A is an explanatory view of a deadlock in a network connected in a torus manner. In this figure, the network is formed by four nodes ①, ②, ③ and ④]with four uni-directional channels (a) (b) (c) and (d) connecting them.

In FIG. 1A, when all 4 nodes forming the network start to perform clockwise data transfer by a wormhole routing method, the message from node ① is transferred using channel (a), the message from node ② is transferred using channel (b), the message from node ③ is transferred using channel (c) and the message from node ④ is transferred using channel (d). However, when the following flit of the message is transferred at the next clock, the message from node ① cannot use channel (b) and is blocked because channel (b) is already being used for the transmission of the message from node ②. The following flit of the message transmitted from node ② similarly cannot use channel (c) and is blocked. The message transmitted from nodes ③ and ④ are blocked in the same way and since all messages are blocked, the result is a deadlock state. This deadlock state is caused, for example, by the length of the data being greater than the length between two channels. In such a case, when data is transmitted from node ① to node ③ the last part of data to be transmitted from node ② to node ④ has the last portion remaining in channel (b). Thus, the data transmitted from node ① to ③ node cannot enter channel (b). Therefore, transfer of data from node ① to node ③ and from node ② to node ④ is blocked.

A virtual channel method is known to be an algorithm for avoiding such a deadlocked state. A communication system using this method is explained by referring to FIG. 1B, in which a channel connecting two nodes is uni-directional and all nodes are virtually doubled. The channel connecting nodes ① and ② is uni-directional from node ① to node ② and is formed of double channels comprising (a) and (a̲) This double channel is originally virtual and comprises one channel in terms of hardware. However, two channels may be naturally provided in terms of hardware. Respective channels imaginarily doubled can store a flit of a message, one of the flits stored in channel (a) or (a̲) being transferred from node ① to node ②. The channel through which respective flits are to be transferred is determined for every flit.

A method of using channels which are doubled upon transmitting a message from respective nodes is as follows.

① —(a̲) — ② —(b̲) — ③ —(c) — ④    Message M1

② —(b̲) — ③ —(c) — ④ —(d̲) — ①    Message M2

③ —(c̲) — ④ —(d̲) — ① —(a̲) — ②    Message M3

④ —(d̲) — ① —(a̲) — ② —(b̲) — ③    Message M4

By doubling a channel, the deadlock state in which all messages are blocked can be avoided.

Even in a system using a virtual channel, as shown in FIG. 1B, there is a problem in that the transfer ability is lowered when a message is transferred clockwise through all the nodes. At the first block, node ① transmits the message through channel (a); next, node ② transmits the message through channel (b); then, node ③ transmits the message through channel (c); and finally, node ④ transmits the message through channel (d). Thus, all four channels are used. However, at the second clock, the message is transferred through only two channels. The message transmitted from node ① is also transmitted to node ③ via channel (b), and the message transmitted from node ④ is kept waiting until the transfer of the message from node ① to node ③ is completed and then is also transmitted to node ② via channel (a̲). Similarly, the message transmitted from node ③ is kept waiting until the transfer of the message from node ④ to node ② is completed and then is transferred to node 1 via channel (d). The message transmitted from node ② is kept waiting until the transfer of the message from node ③ to node ① is completed and then transferred to node ④ via channel (c). This is because the length of the message is larger than the distance between two nodes. Thus, when the message is transmitted from node ① to node ③ via node ②, the last part of the message remains in channel (a). Further, the channels which can be used upon transmitting a message between the nodes have been predetermined. For example, in message M2, it is predetermined that channel (C) is not used but channel (C) is used upon transferring the message from node ③ to node ④. Thus, start of transfer of message M2 from node ③ to node ④ is kept waiting until message M3 completes the use of channel (C).

All messages are transferred as described above. The message is transferred via two channels for all clocks except the starting clock. As a result, the transfer capability is lowered even in a vertical channel.

SUMMARY OF THE INVENTION

An object of the present invention is to provide a wormhole routing system for communicating between parallel computers. This system avoids the deadlock state and does not decrease transfer capability.

A feature of the present invention resides in a wormhole routing system for controlling communication between parallel computers. The system comprises means for connecting a plurality of computer nodes within a network by channels for continuously transferring a message divided into a plurality of minimum unit transfer data and means provided in respective nodes for storing a number of minimum unit transfer data equal to the number of relay channels from the originating node to the most remote node. The present invention avoids a deadlock in communication, thereby realizing high speed communication.

BRIEF DESCRIPTION OF THE DRAWINGS

FIG. 2A is a block diagram showing the principle of the first embodiment of the present invention, FIG. 12A shows the relationship between a multiplexer 20 (MUX) in a module of sending and receiving control MSRD and a switching control signal, FIG. 12B shows the relationship between an output of multiplexer 22 (MUX) in module of sending and receiving control MSRD and a switching control signal, FIGS. 18A to 18D are state transition diagrams showing the relationships between the state transition of the counter in the class control module $PRIM_{13}MCOMM$ and the class signal for an output circuit of data output request signals, FIG. 2A is a block diagram showing the principle of the first embodiment. In FIG. 2A, a plurality of computer nodes 1a, 1b . . . 1n are mutually connected by channels 2a, 2b . . . 2n, thus forming a communication network between parallel computers. In this network a message is divided into a plurality of minimum data transfer units, for example, flits comprising several bytes, between computer nodes.

Data storing means 3a, 3b . . . 3n store flits whose number is equal to the number of relay channels from the originating node to the most remote node in the network, plus 1.

Figure 2B:
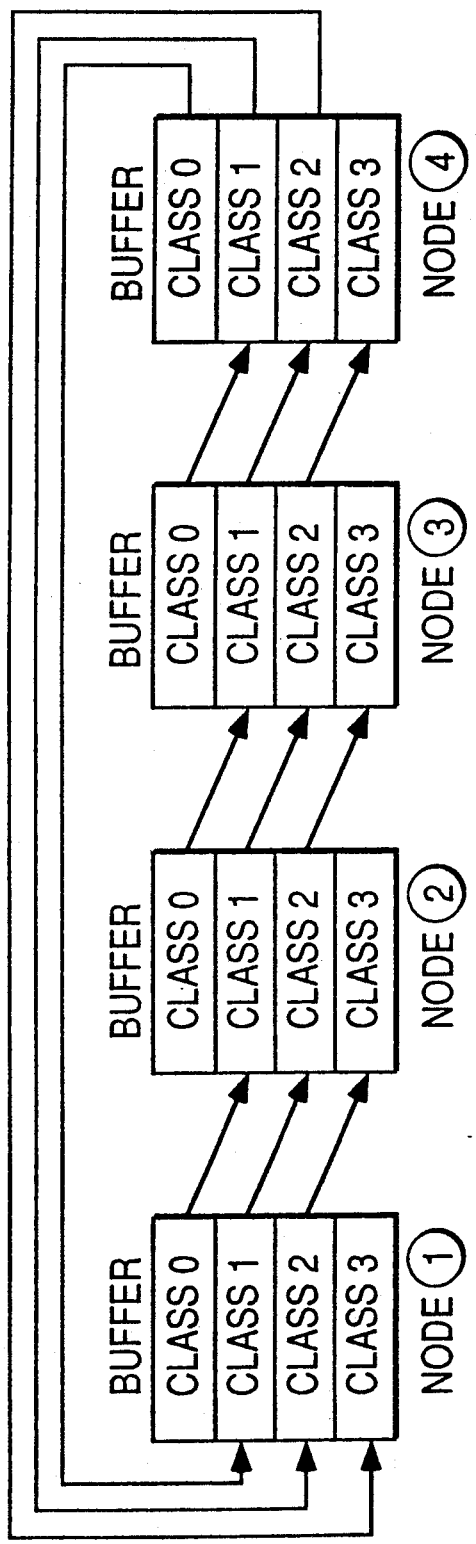
FIG. 2B is a block diagram showing the principle of the second embodiment of the present invention.

FIG. 2B is a block diagram showing the principle of the second embodiment. Each data storing means 3a, 3b . . . 3n shown in FIG. 2A is divided into a plurality of areas. Each of these areas can store each of the above recited minimum data transfer units, namely, each of the flits. Class number 0 is given to the flit which the originating node starts to transfer and class numbers 1, 2 . . . n are given to flits having message transfer source nodes input to the originating node through 1, 2, . . . n relay channels. When data is transferred within a network, respective nodes output a flit within the region of the highest priority class number selected from among a plurality of flits provided in data storing means $3a$, $3b$ ... $3n$ from respective originating nodes to the adjacent nodes.

The network in FIG. 2B comprises four nodes. For simplicity, buffers corresponding to data storing means $3a$, $3b$ ... $3n$ are divided into four regions with class numbers 0 to 3. These buffers use a system in which the class number increases in accordance with the number of relay channels. For example, a message is transmitted from node ① to node ③ in the sequence class 0 of node ① → class 1 of node ② → class 2 of node ③ . Similarly, a message is transmitted from node ① to node ④ in the sequence class 0 of node ① → class 1 of node ② → class 2 of node ③ → class 3 of node ④. Furthermore, when a data transfer starts from other nodes, the buffers are used in the sequence class 0 → class 1 → class 2 → class 3. The data class is transmitted together with the data (i.e., the flits) to designate the class in which the flits are stored.

Figure 1A:
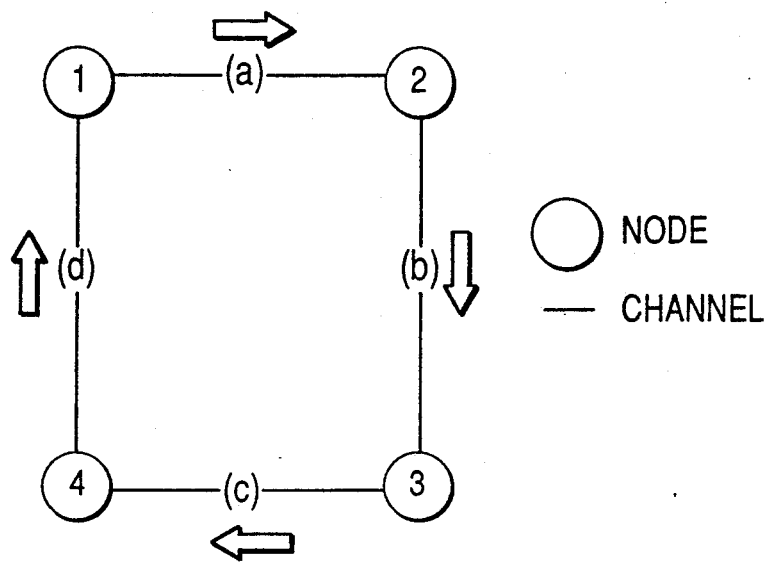
FIG. 1A is a block diagram of a network in which a plurality of computer nodes is connected in a torus state.
Figure 1B:
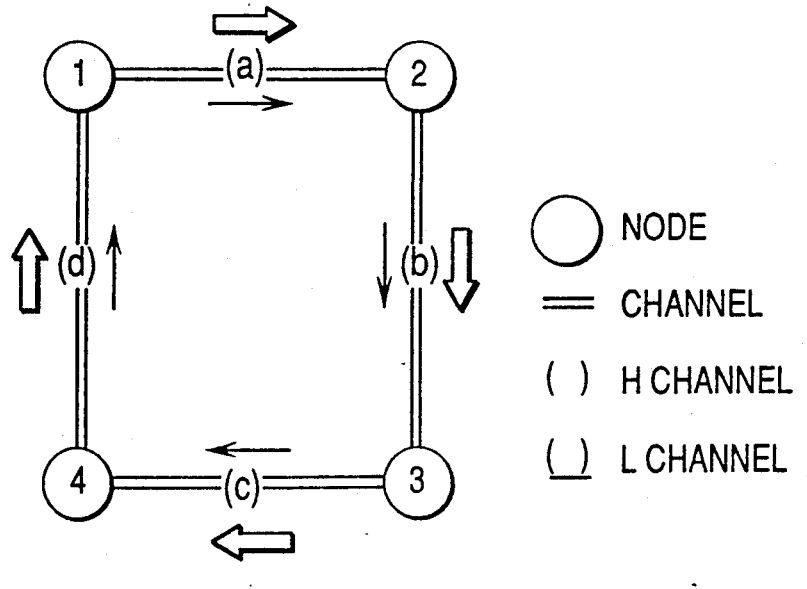
FIG. 1B shows a conventional example of a communication control system using virtual channels.

Let's suppose the case where the data of all the nodes are simultaneously transferred clockwise, as shown in the conventional example of FIG. 1A. That is, at the first clock, the first flit of the message from nodes ①, ②, ③ and ④ are respectively transmitted to class 1 of the buffers in nodes and ②, ③, ④ and ①.

At the next clock, the first flit from nodes ①, ②, ③ and ④ are transmitted to class 2 of node buffers ③, ④, ① and ②, respectively.

At the following clock, the first flits of respective messages are transmitted to class 3 of the buffers of respective nodes ④, ①, ② and ③. In this way, the present invention can transfer data by using all the channels in all the clocks.

FIG. 2B shows, for simplicity, a one-dimensional torus-type network in a uni-directional channel. However, it is possible to apply the present invention to bi-directional or two-dimensional networks, as will be explained in detail for an embodiment of the invention.

Figure 3A:
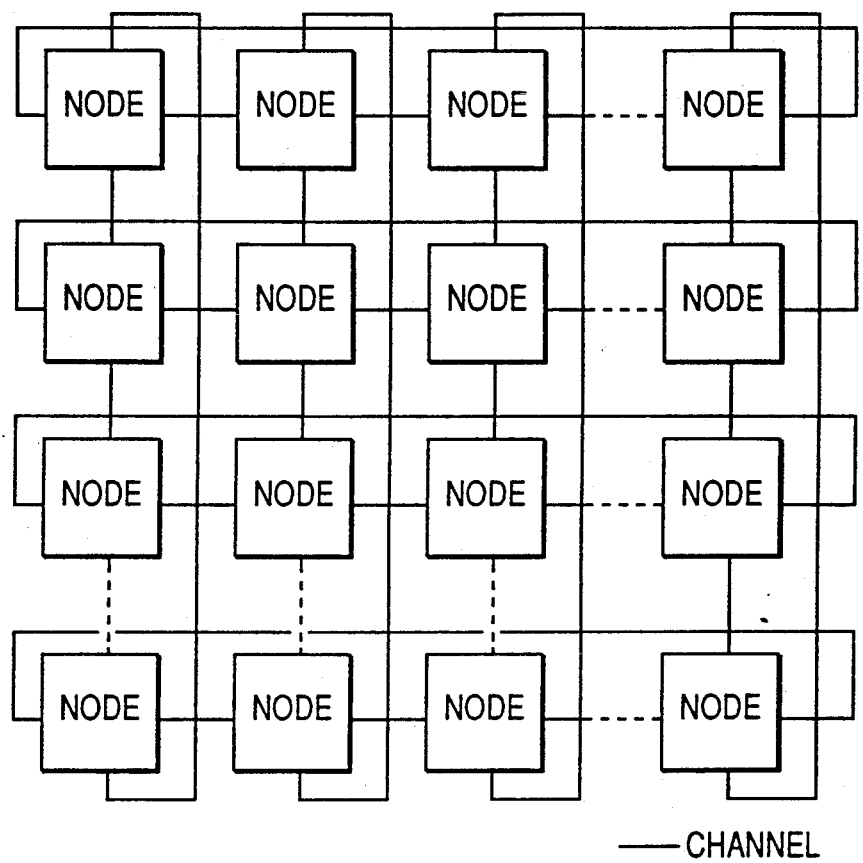
FIG. 3A is a block diagram showing the entire structure of the communication network system between parallel computer nodes according to the present invention.

FIG. 3A shows the entire structure of a system for controlling communication between parallel computer nodes in accordance with the present invention. Adjacent nodes are connected by bi-directional channels. The network comprises a maximum of 32 nodes in both the transverse (east - west) and vertical (north - south) directions.

Figure 3B:
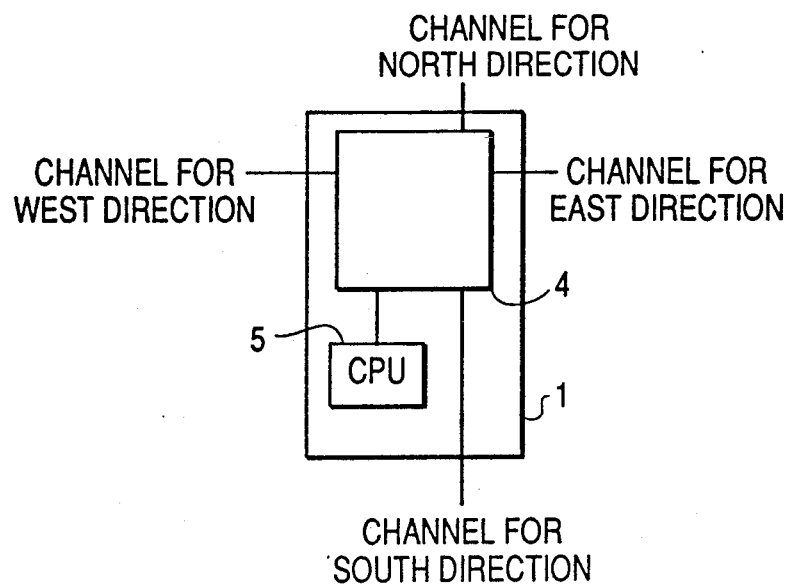
FIG. 3B is a block diagram showing the entire structure of a node.

FIG. 3B is a block diagram showing the structure of one node. The node 1 comprises routing unit 4 for controlling the transfer direction of a message within the communication network, and a CPU 5. It is connected to adjacent nodes in the east, west, south and north directions.

In the network shown in FIG. 3A, the data transferred from a node to a communication destination node is controlled by the header flit, i.e., the first flit of the input message.

Figure 4:
FIG. 4 shows a format of the header flit of the message.

FIG. 4 shows an embodiment of the header flit. In FIG. 3A, it is supposed that the message is first routed in the right or left (east or west) direction and then in the lower or upper (south or north) direction. It is further supposed that respective flits of the message comprise 32 bits from 0 to 31. When the header flit comprises xs at the 31st bit to designate the transfer direction (X direction) of the message as either east or west, xrcid from the 24th to 30th bit to designate the transfer distance of the message in the east or west direction or the number of the relay channels, ys at the 23rd bit for designating the transfer direction (Y direction) of the message as south or north, and yrcid from the 16th to the 22nd bit to designate the transfer distance in either the south or north direction, namely, the number of relay channels.

In FIG. 4, when xs is 0, the message is transferred to the east direction; when xs is 1, the message is transferred to the west direction; when ys is 0, the message is transferred to the south direction; and when ys is 1, the message is transferred to the north direction. Then, as shown in FIG. 3A, if the message is transferred three nodes to the east (right) and two nodes to the south (lower) of a particular node, $xs=0$, $xrcid=3$, $ys=0$ and $yrcid=2$ in the header flit of the message. The message is then first transferred three nodes to the east of the particular node and then 2 nodes to the south of the particular node, i.e., to the communication destination node.

In this case, in a routing of the message in the network, the node number of the destination node counted from the transmission source node is expressed as $(+3, +2)$. Every time the message proceeds one node to the east, namely, the x direction, X of the relative node number is decremented and when the header flit arrives at the node three nodes east of the transmission source node, the relative node number becomes $(0, +2)$, thereby completing a routing in the x direction. The routing is then conducted in the north south direction, i.e., the y direction, and when the relative node number becomes $(0, 0)$, the routing is completed.

Figure 5:
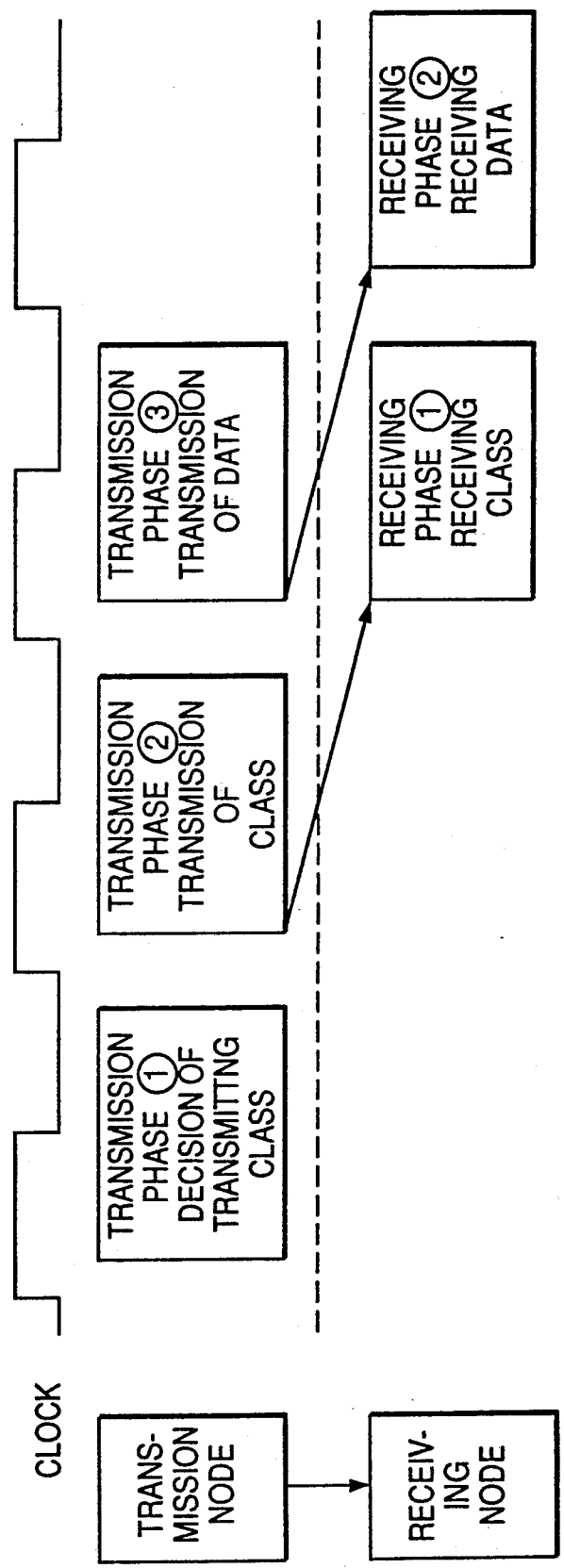
FIG. 5 is a timing chart for explaining the basic method of data transfer between adjacent nodes.

FIG. 5 shows the basic system for transferring data between adjacent nodes according to the present invention. As shown in FIG. 2B, the data of the class number region in the data storing means, for example, in the buffer of the originating node, is transmitted to the adjacent node. The transmission buffer of the transmission node side is divided into 3 phases 1 to 3. At phase 1, the data in the highest class in the buffer of the originating node is determined as the transfer data. At the next clock, the process of phase 2 is conducted, i.e., the class number of the data is transmitted. At the following clock, the process of phase 3 is conducted, i.e., the data flit is transmitted.

The class number transmitted by phase 2 on the transmission side is received on the receiving node side at the clock in which the process of the phase 3 of the transmission node side is conducted. At the next clock, the data flit is received from the transmission node. Namely, transmission and receipt of one data flit is conducted in a period of 4 clocks. The transmission class determined by phase 1 on the transmission node side is the class having a buffer which is not full in the receiivng node side and satisfies the condition that the class is the highest class selected from the classes transmitting the transmission request from the receiving node side.

Figure 6:
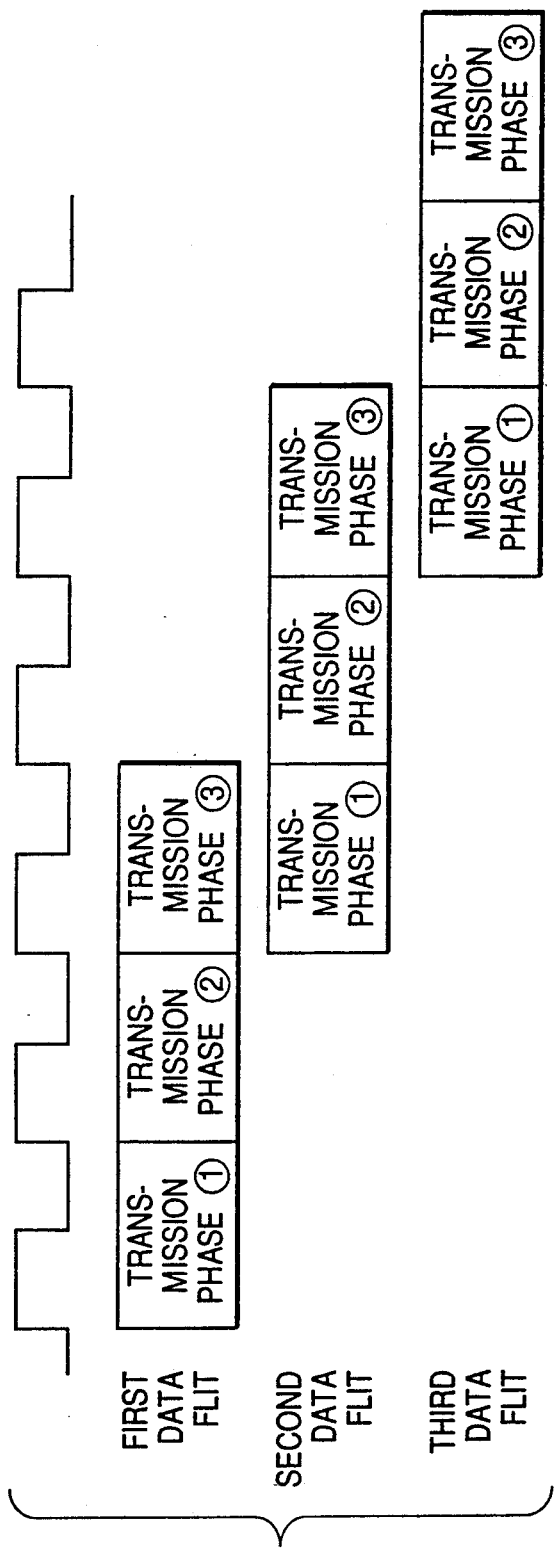
FIG. 6 is a timing chart for explaining the output system of the continuous data flit outputted from one node.

FIG. 6 shows the system for continuous output of data flits from 1 node. The 3 data flits are output in a pipeline manner. The transmission phase 3 of the first data flit and the transmission phase 1 of the second data flit are processed at the same clock. Phase 2 of the first data flit and phase 1 of the second data flit may be simultaneously processed at the same clock. Also, phase 3 of the first data flit and phase 2 of the second data flit may be processed at the same clock.

Figure 7:
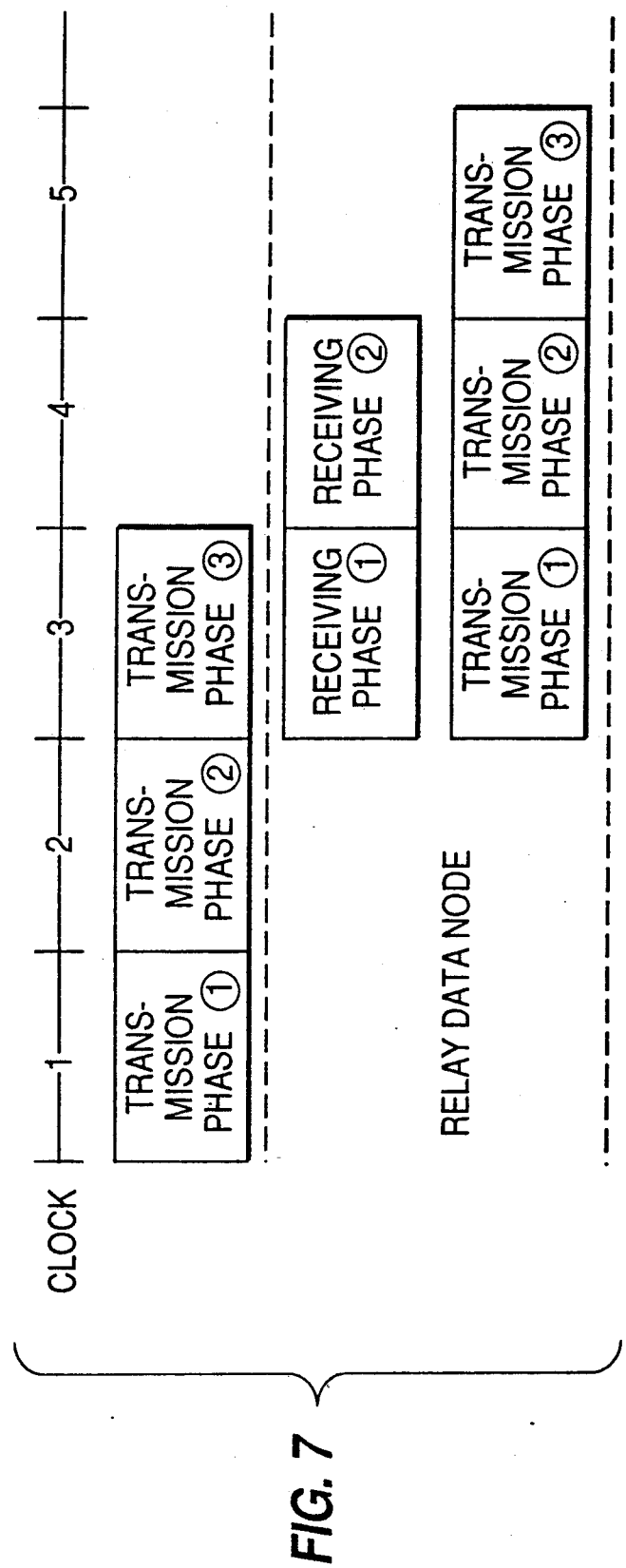
FIG. 7 is a timing chart for explaining the data relay system.

In the present invention, the data transmitted from the adjacent node may not be directed to the originating node, but further transmitted to the next adjacent node, thus using the receiving node as a relay node. In this case, the data is transmitted to the adjacent node immediately without being stored in the buffer, thus achieving high speed transfer. The embodiment of such data relay system is shown in FIG. 7. At the data relay node, the existence or non-existence of the relay of data can be detected from the class of data received at receiving phase 1 at clock 3. When at clock 3, a class is selected for the data transfer in transmission phase 1, the data received at receiving phase 2 at clock 4 is transmitted to the next node in transmission phase 3 at clock 5 without being changed.

In the transmission node, the class to be transmitted is determined at transmission phase 1, the determined class number is transmitted at transmission phase 2, and the data in the class is transmitted at transmission phase 3. In the relay node, the class is received at receiving phase 1 and the transmission data is received at receiving phase 2. In the relay system, at the same clock 3 as in receiving phase 1, the transmission class is determined at the transmission phase 1 and then, the transmission class and data are transmitted to the next node at transmission phases 2 and 3, respectively, to perform a relay operation, as shown in FIG. 7.

Figure 8:
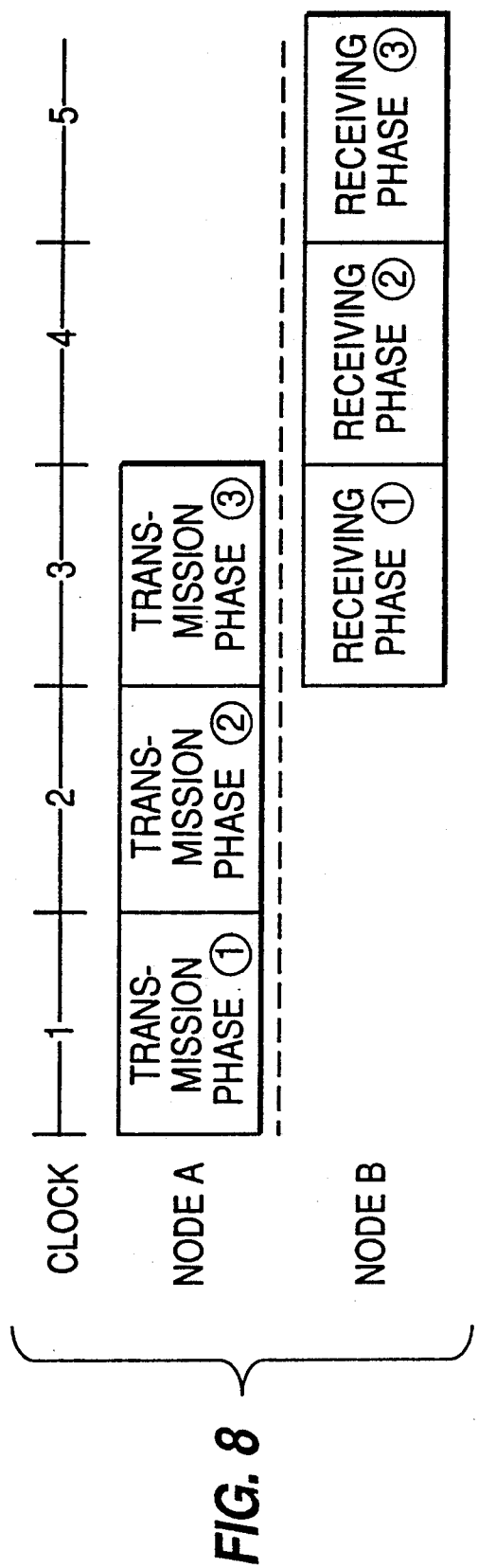
FIG. 8 is a timing chart for explaining the system for notifying the originating node buffer-full possibility to the node adjacent to the transmitting source node.

In the relay system shown in FIG. 7, the buffer of the destination node of the data to be relayed may be full or although another class is selected as the transmission data the class of the relay data may not be transmitted. This data is then stored in the buffer of the originating node. The transmission source adjacent node which transmits the relay data to the originating node is notified that the buffer within the originating node may become full. Such a notifying system is shown in FIG. 8.

It is supposed that the data is transmitted from node A to node B and that node B stores the data transmitted from node A in a buffer in receiving phase 3. When at node B, the class received at receiving phase 1 at clock 3 is not transmitted, node A is notified at clock 4 of the possibility of the buffer becoming full. Thus, at clock 5, node A knows whether or not the buffer within node B becomes full. As shown in FIG. 6, the data flit is transferred by the pipeline system. Thus, even if node A knows at clock 5 that node A has already transmitted the next data, the buffer within node B needs to store two data flits. Node A is notified when the data in the node B buffer has been transmitted and the buffer becomes empty. According to the present invention (described later), the class information at the clock of transmission phase 2 designates the class in which the buffer is empty as well as the class of the data to be transmitted.

Figure 9A:
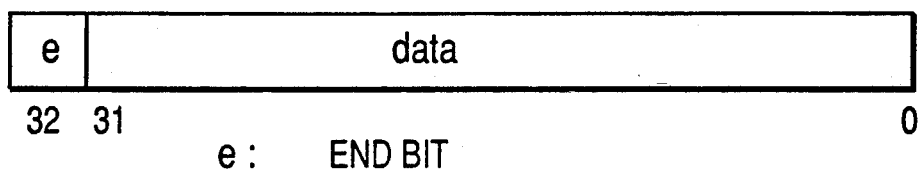
FIG. 9A shows a format of data subjected to a routing within the network.

FIG. 9A shows data subjected to a routing in a network and the format of the transmitted class information together with the data flit shown in FIG. 5. FIG. 9A shows a format of the data flit. End bit e is added to the data, i.e., data of 32 bits, which is the same as the header flit shown in FIG. 4, thereby providing a format of 32 bits. When "1" is provided at an end bit, it is shown that the data flit is the last flit of the message.

Figure 9B:
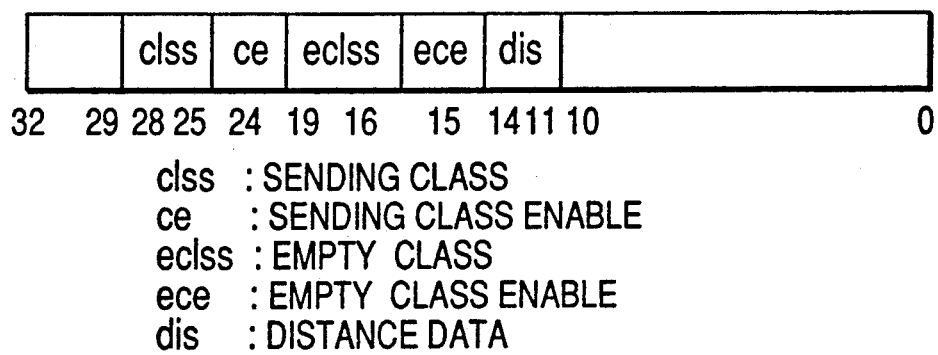
FIG. 9B shows an embodiment of the format of the transmitted class information accompanied by respective data flits.

The class information shown in FIG. 9B is used to control a transfer of the data flit between adjacent nodes. This information comprises distance data dis, subtracting "1" from the number of relay channels from the originating node to the final position node in an east - west or a south - north directional routing, class information clss designating the class in a buffer of the transmission signal, transmission class enable signal ce designating an enable of transmitting class information, empty class information eclss designating an empty class in a buffer of the originating node for storing the received data from the destination of the transfer information and empty class enable signal ece for designating an enable of empty class information.

As described previously, the network shown in FIG. 3A comprises a maximum of 32 nodes in both the east - west and north - south directions. Furthermore, the channels connecting the nodes are bi-directional. Thus, the maximum distance of the transfer of the message in the east - west or south - north directions is 16 and the highest class number of the buffer within respective nodes is also 16. Thus, distance data dis, receiving class information clss, and empty class information eclss comprise data of 4 bits. The class information and the empty class information within the buffer in the originating node are transferred simultaneously. This is because the channels are bi-directional and can receive data from opposite nodes.

Figure 10:
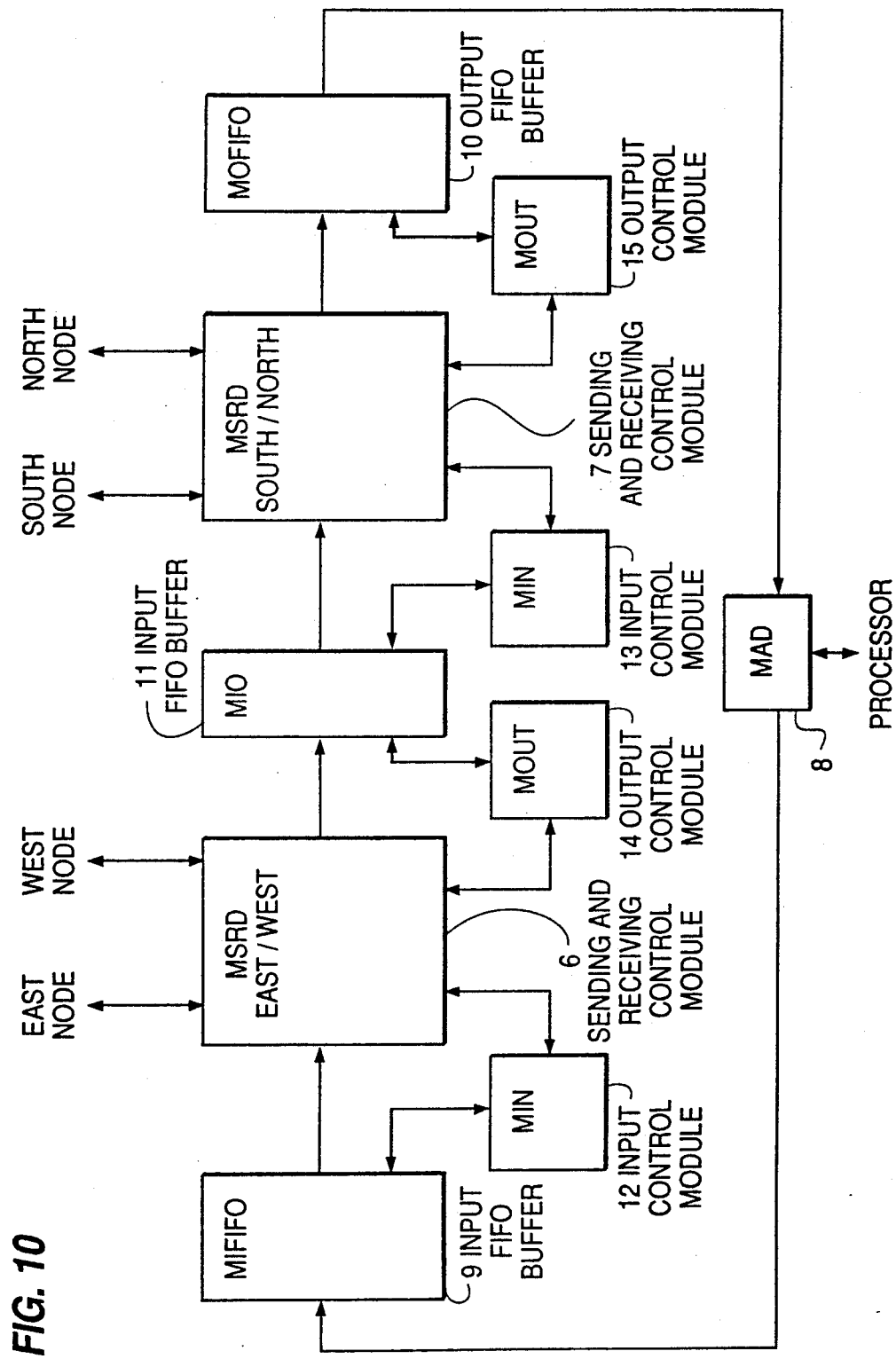
FIG. 10 is a block diagram of the entire structure of an embodiment of the routing unit.

FIG. 10 shows a block diagram of the entire structure of routing unit 4 within node 1 shown in FIG. 3B. The routing unit PSRU comprises the east - west direction module of sending and receiving device MSRD 6, the south - north direction module of sending and receiving device MSRD 7, the module of the processor interface with CPU side MAD 8, the module of the first in first out system for inputting the data of the processor of the originating node MIFIFO 9, the module of the output buffer of the first in first out system for outputting the data to the processor MOFIFO 10, the module of the input-output buffer MIO 11 between the east - west direction MSRD 6 and the south - north direction MSRD 7. Two modules of input control MIN 12 and 13 for controlling data input from input buffer MIFIFO 9 to MSRD 6 and from MIO 11 to MSRD 7 and two control outputs MOUT 14 and 15 for controlling the data output from MSRD 6 to MIO 11 and from MSRD 7 to MOFIFO 10.

Figure 11:
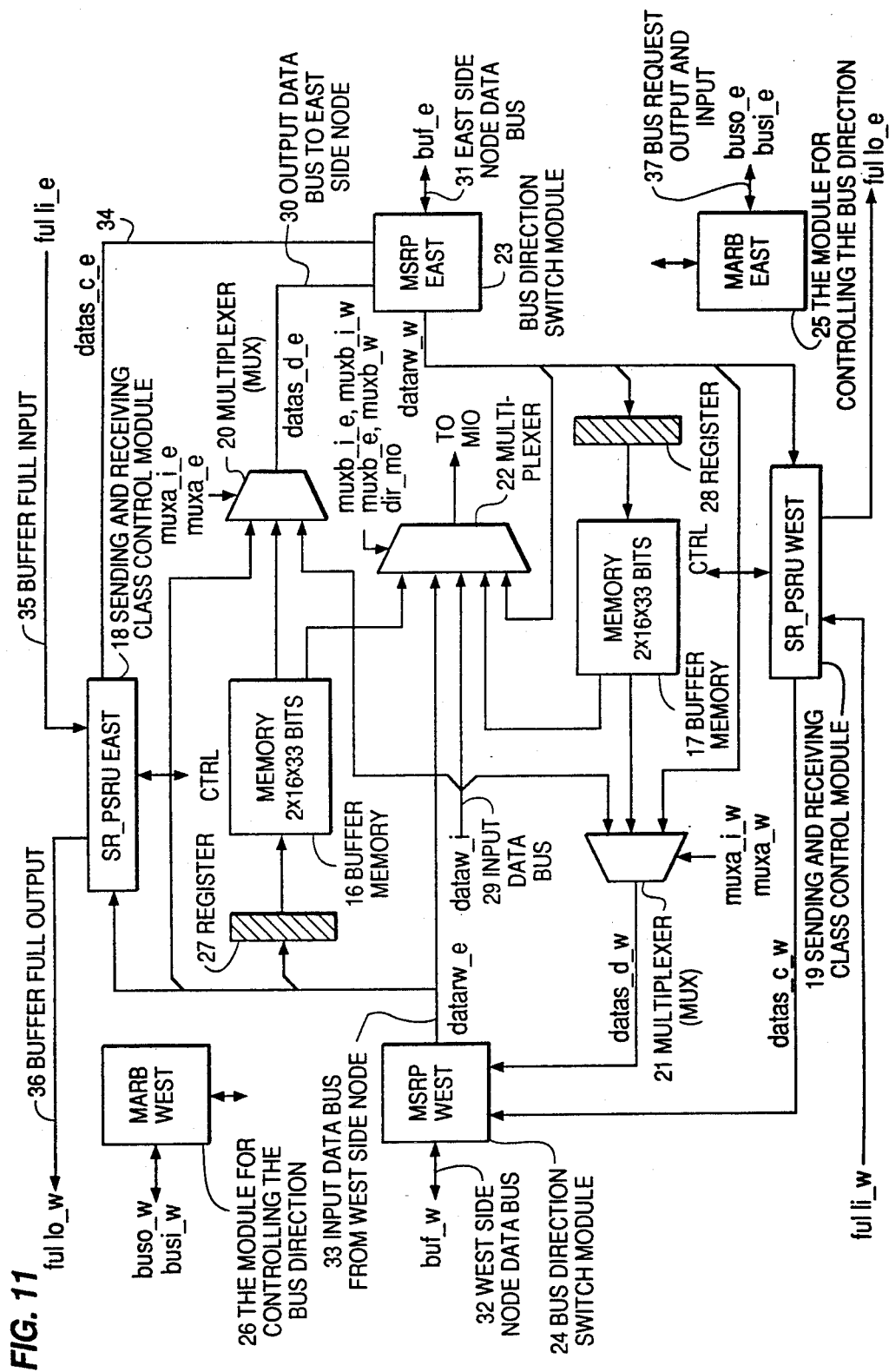
FIG. 11 is a block diagram showing the structure of the sending and receiving control module MSRD.

FIG. 11 shows a block diagram of a module of a sending and receiving device MSRD 6 with an east - west structure. The MSRD being provided in routing until PSRU and controlling the data sending and receiving operation between the originating node and the adjacent node. Buffer memories 16 and 17 have two ports for storing the data in the east and west directions, respectively. As stated above, a data flit comprises 32 bits and the maximum number of classes is 16. Furthermore, it is necessary to store, in one class, two data flits, one from the east and the other from the west. In one class, the capacity of the memory becomes $2 \times 16 \times 33$ bits, 2 corresponding to east and west, 16 corresponding to the number of classes, and 33 corresponding to the data.

Sending and receiving class control modules $SR_{13}PSRU$ 18 and 19 manage the classes of the data output in the east and west directions, respectively. Multiplexers 20 and 21 switch the data to be outputted in the east and west directions, respectively. Multiplexer 22 switches the output data to the module of input and output buffer MIO 11. In the case of south and north direction MSRD 7, the output of multiplexer 22 is inputted to MOFIFO 10.

Bus direction switch modules MSRP 23 and 24 are interfaces to the adjacent nodes in the east and west directions, respectively. When the originating node owns or occupies the channel to the adjacent node, i.e., the originating node owns or occupies the bus to the adjacent node, it alternately transmits the class information and data flit to the adjacent node. When the originating node does not own the bus, it receives the data and class information from adjacent nodes.

The modules for controlling the bus direction MARB 25 and 26 control the direction of the channels between the originating and adjacent nodes in the east and west directions, respectively, i.e., the direction of the bus. As one channel is used bi-directionally, the transmission direction is switched once per four clocks by using units of four clocks for the transfer of one data, as shown in FIG. 5. If, an adjacent node wants to occupy the bus, the node then owning and occupying the bus must release it at a certain time in response to the bus request from the adjacent node. When the node not occupying the bus has data to be output or an empty class in its buffer, it can output a transmission request to the other node and thus occupy the bus. Registers 27 and 28 temporarily store data in the east or west directions and output them to buffer memories 16 and 17. Therefore, the data stored in buffers 16 and 17 are delayed by one clock.

Next, the data flow within the module of sending and receiving control device MSRD shown in FIG. 11 is explained. The input data from the processor of the originating node, i.e., the input signal to MSRD 6 from MIFIFO 9 in FIG. 10, is input to three multiplexers, 20, 21 and 22, through input data bus $dataw_{13}i$ 29 in FIG. 11. When the data is transmitted to the adjacent node in the east direction, multiplexer 20 transmits it to the east side node through output data bus $datas_{13}d_{13}e$ 30 and the bus direction switch module MSRP23 to east side node data bus $buf_{13}e$ 31. When the data is directed to the adjacent node in the south or north direction, multiplexer 22 transmits it to the input and output buffer module MIO11 in FIG. 10.

Next, data from the west side adjacent node is input to direction switch MSRP 24 through west side node data bus $buf_{13}w$ 32. Then, the data is input to multiplexer 22, register 27, multiplexer 20 and sending and receiving class control module $SR_{13}PSRU$ 18 through input data bus $datarw_{13}e$ 33 for the west side node. As recited above, respective data flits accompany the class information designating the class number of the data. First class information and then the data flits are transmitted in the network. Class information is input to the sending and receiving class control mosulw $SR_{13}PSRU$ 18 and the data flit is input to multiplexer 22, register 27 and multiplexer 20.

The input data is transmitted to the east side node without being stored in the buffer memory. That is, when the data is relayed, it is transmitted to the east side adjacent node through the bus direction switch module MSRP 23 and multiplexer 20. If it is necessary to store the data in a buffer memory before outputting it, it is stored in buffer memory 16 through register 27, and when the buffer memory in the east side node becomes empty, it is output from multiplexer 20. When the input data from the west side node is directed to the processor of the originating node, it is then output from multiplexer 22 and transferred to the processor of the originating node through input and output buffer module MIO 11, sending and receiving device module MSRD 7, output FIFO module MOFIFO 10 and processor interface module MAD 8. Then, except when the data is transferred to the processor of the originating node, in other words, when it is outputted to the adjacent node, the class information attached to the data flit is transmitted from sending and receiving class control module $SR_{13}PSRU$ 18 through the east side node output class information bus $datas_{13}c_{13}e$ 34 to the bus direction switch module MSRP23. The class information and data flit are alternatively outputted from bus direction switch module MSRP23 to the east side node data bus $buf_{13}e$ 31.

The sending and receiving class control module $SR_{13}PSRU$ 18 controls the class of the data to be transmitted to the east side node as recited above at the next time and it is necessary to know the state of the buffer in the transmission destination. Therefore, sending and receiving class control module $SR_{13}PSRU$ 18 of the originating node receives buffer full signal $fulli_{13}e$ 35 from the east side node. It also outputs buffer full output $fullo_{13}w$ 36 to the west side node to indicate that the buffer in the originating node is full.

In order to control which node occupies east side node data bus $buf_{13}e$ 31, the module of controlling bus direction MARB 25 transmits and receives bus request output $buso_{13}e$ and bus request input $busi_{13}e$ 37 to and from the corresponding module in the adjacent node.

The data input through data bus $buf_{13}e$ 31 from the east side node, processed in the same manner as the data from the west side node, is transmitted to the west side node through bus direction switch module MSRP 24 and is output from multiplexer 22 to input and output buffer module MIO 11. The control method is performed as recited above.

The relation between the switching control signals of multiplexers 20 and 22 and the outputs of respective multiplexers are shown in FIG. 12. The signal $dir_{13}mo$ is output from output control module MOUT 14 in FIG. 10 and other signals are output from memory control module MCTRL in sending and receiving class control module $SR_{13}PSRU$ 18. The control signals to multiplexer 21 are the same as those to multiplexer 20.

Figure 13:
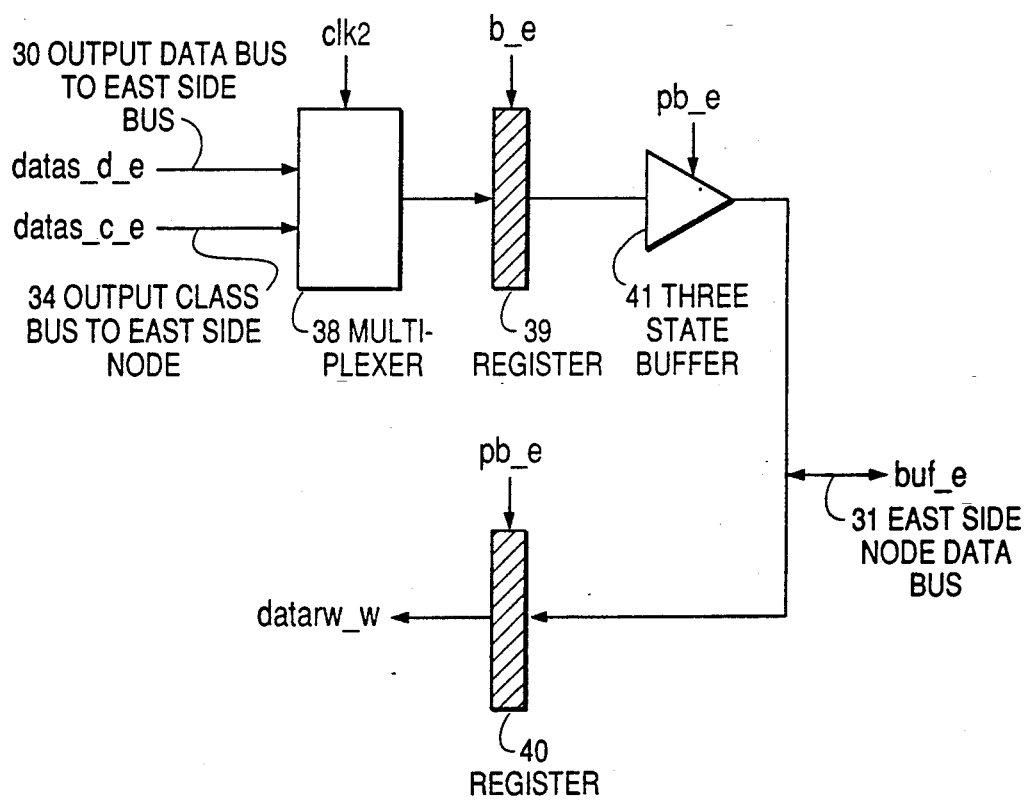
FIG. 13 is a block diagram showing the structure of module of bus direction switching MSRP.

FIG. 13 is a block diagram showing the structure of bus direction switch module MSRP 23 for switching east side node data bus $buf_{13}e$ 31 in FIG. 11 and comprises a multiplexer 38, two registers 39 and 40, and a three-state buffer 41. The signals from output data bus $datas_{13}d_{13}e$ 30 connected to multiplexer 20 and output class information bus $datas_{13}c_{13}e$ 34 connected to sending and receiving class control module $SR_{13}PSRU$ 18 to the east side node are switched alternately at every clock signal clk2 to register 39 and three-state buffer 41, and then to east side node data bus $buf_{13}e$ 31. Control signal $b_{13}e$ of register 39 becomes "H" when the originating node has the right of bus and control signal $pb_{13}e$ of three-state buffer 40 is delayed by 1 clock from control signal $b_{13}e$ for register 39. Register 40 temporarily stores the data input from the east side node through east side node data bus $buf_{13}e$ 31.

Figure 14:
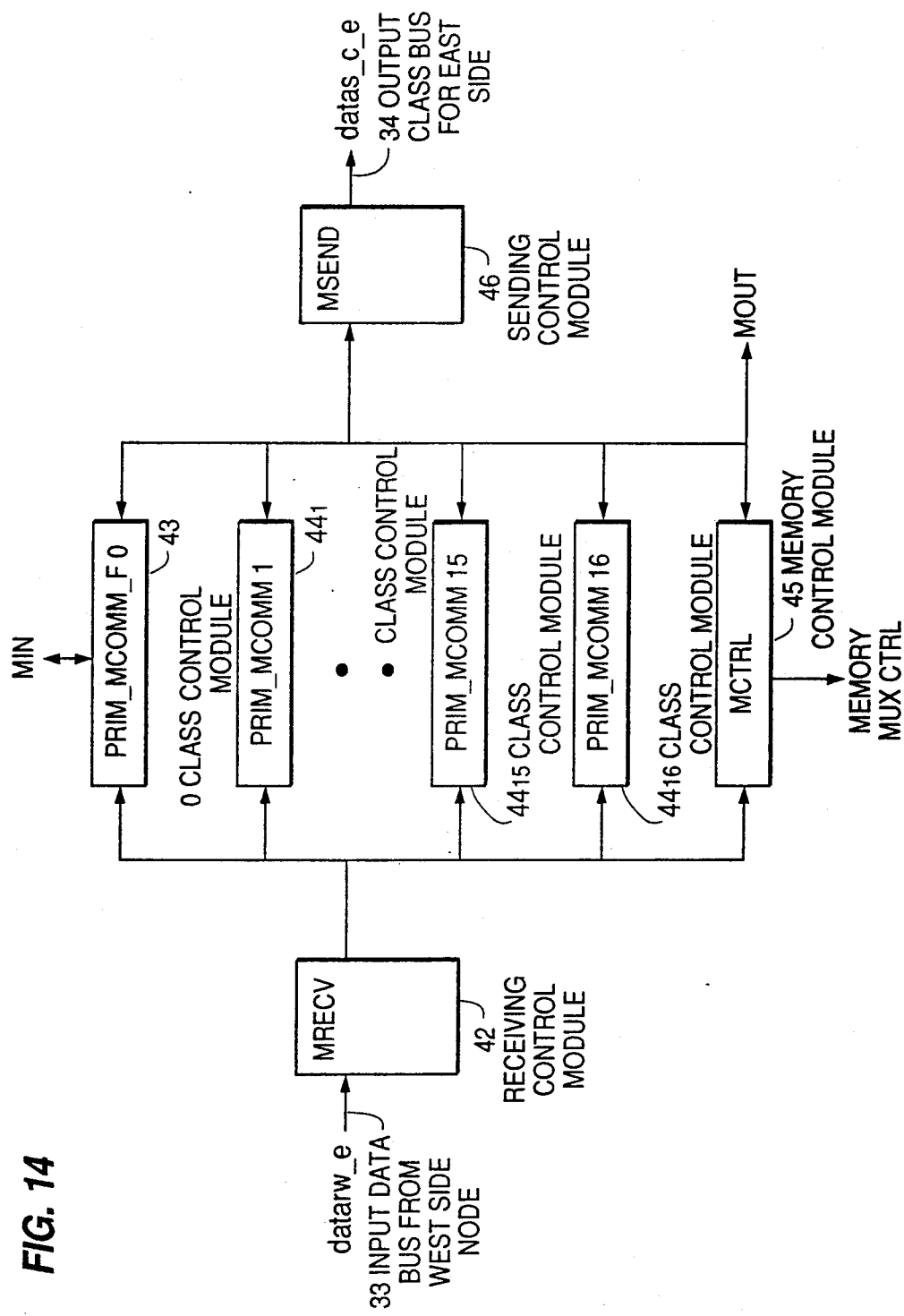
FIG. 14 is a block diagram showing the entire structure of sending and receiving class control module $SR_{13}PSRU$.

FIG. 14 is a block diagram showing the entire structure of a module of sending and receiving class control $SR_{13}PSRU$. This module receives class information from the adjacent node and a data output request from input control module MIN 12, and forms class information to be transmitted to the adjacent node or input and output buffer module MIO 11. Sending and receiving class control module $SR_{13}PSRU$ in FIG. 14 corresponds to sending and receiving class control module $SR_{13}PSRU$ 18 in FIG. 11 and comprises receiving control module MRECV 42 connected to the input data bus $datarw_{13}e$ 33 from the west node, a total of 17 class control modules $PRIM_{13}MCOMM$ 43, $44_1$, . . . $44_{16}$, a memory control module MCTRL 45 and sending control module MSEND 46 connected to the output class information bus $datas_{13}c_{13}e$ 34 to east side node.

In FIG. 14, class control modules $PRIM_{13}MCOMM$ $44_1, \ldots 44_{16}$ manage respective classes of the data in the buffer memory in the originating node. The 0 class control module $PRIM_{13}MCOMM_{13}F$ 43 manages the class of the data from the processor of the originating node. A total of 16 class control module $PRIM_{13}$-$MCOMM$ $44_1$ to $44_{16}$ manage the data corresponding to respective classes in the buffer memory in the originating node. As recited above, in the entire structure shown in FIG. 3A, class control module $PRIM_{13}$-$MCOMM$ $44_1$ to $44_{16}$ are provided to 16 respective classes corresponding to the maximum distance between the nodes.

Receiving control module MRECV 42 decodes class information from the adjacent node and notifies receipt of the data to class control module $PRIM_{13}MCOMM$ for the corresponding class.

Sending control module MSEND 46 selects the highest class from the transmission requests from class control module $PRIM_{13}MCOMM_{13}F0$ to $PRIM_{13}$-$MCOMM_{13}F$ 16 43, and this class becomes the transmission class number clss in the format of class information recited in FIG. 9B. In order to notify the empty class in the buffer memory for storing the data which the originating node receives from the east side node to the west side node, sending and receiving class control module $SR_{13}PSRU$ 19 shown in FIG. 11 receives the class information from the east side node. The west direction data buffer memory in the originating node receives data from sending and receiving class control module $SR_{13}PSRU$ 19 and the signals designating the existence or non-existence of 17 empty classes. It then selects the highest of the empty classes and determines the empty class number eclss as the class information corresponding to the empty class. This forms the class information to the east side node.

At the west side node, the class information is formed by adding "1" to the class number of the west side node, to provide class 1 of the originating node in the case of class 0 in the west side node. Therefore, it is necessary to notify the west side node that class 1 in the originating node is actually empty, thus determining the class information to be sent from the west side node to the originating node.

In FIG. 14, 0 class control module $PRIM_{13}$-$MCOMM_{13}F$ 43 sends and receives control information for the data input through the input buffer module MIFIFO 9 from the processor of the originating node in FIG. 10 with the input control module MIN12. Memory control module MCTRL 45 outputs a switching control signal to buffer memory 16 and multiplexers 20 and 22 in FIG. 11. Furthermore, a control signal is sent and received between memory control module MCTRL 45 and output control module MOUT 14 in FIG. 10.

Figure 15:
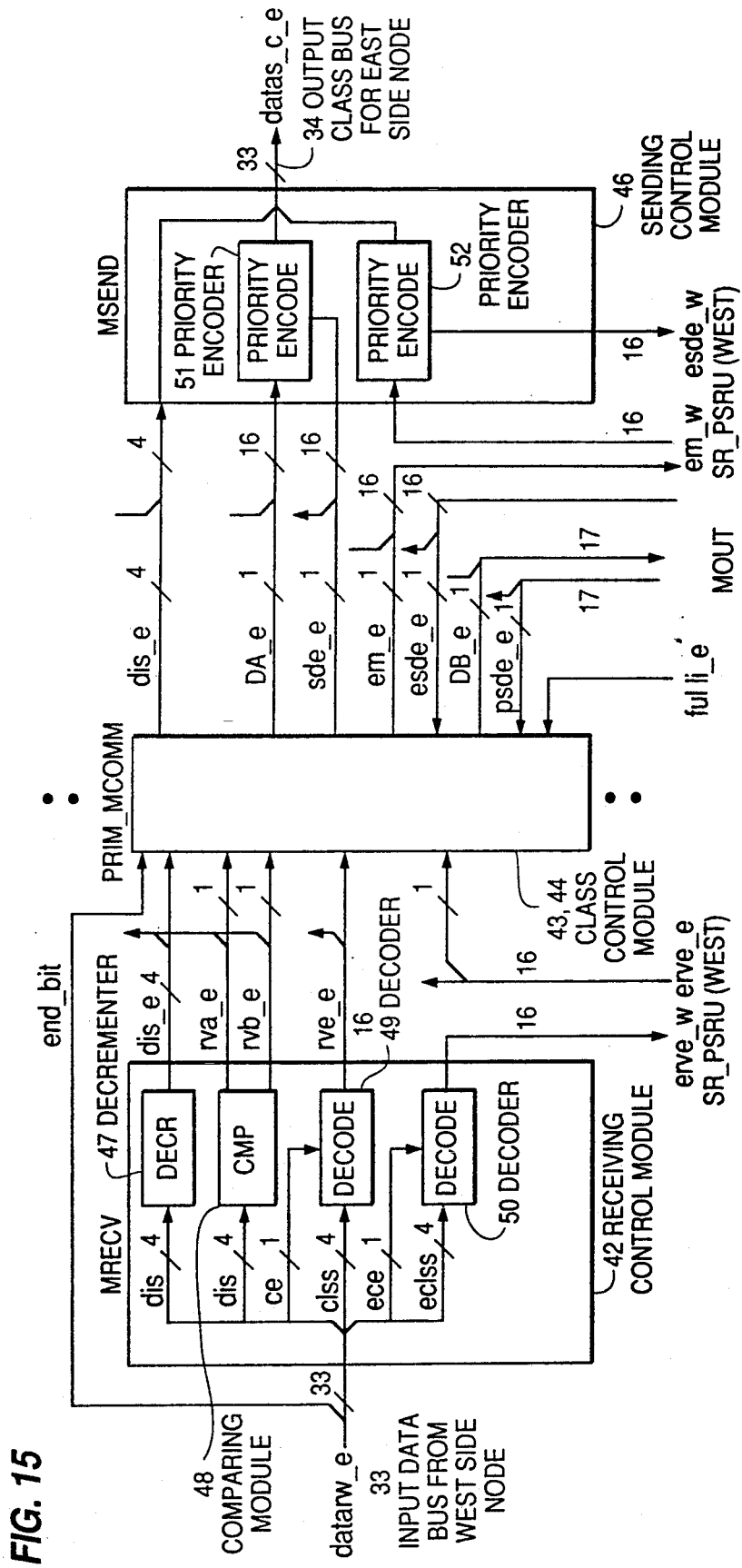
FIG. 15 is a block diagram showing the input and output states of signals with regard to sending and receiving class control module $SR_{13}PSRU$.

FIG. 15 shows an input and output state of the signal for sending and receiving class control module $SR_{13}PSRU$. In FIG. 15, only one of 17 class control modules $PRIM_{13}MCOMM$ is shown. Receiving control module MRECV 42 comprises decrementer DECR 47, comparing module CMP 48, and two decoders DECODE 49 and 50.

As recited above, receiving control module MRECV 42 receives data from the west side node through input data bus $datarw_{13}e$ 33. The data comprises 33 bits, as shown in FIG. 9A, and only the end bit is directly input to class control module $PRIM_{13}$-$MCOMM$ 43 and 44. The distance dis designating the number of the relay channels to the destination node in the east - west direction (or the north - south direction) in the input class information, $-1$ is input to decrementer DECR 47 and comparing module CMP 48.

When the data arrives at the originating node, the distance to the destination node is decreased by one and the output of decrementer DECR is input to respective class control modules $PRIM_{13}MCOMM$ 43 and 44 as the new distance data dis. Comparing module 48 detects whether or not the distance data is 0. If it is not, the east direction enable signal $rva_{13}e$ is transmitted to class control modules $PRIM_{13}MCOMM$ 43 and 44 for a relay operation. If it is, the originating processor direction enable signal $rvb_{13}e$ for designating the originating processor direction or designating a change in direction from the east side to the south or north directions is transmitted to respective class control modules $PRIM_{13}MCOMM$ 43 and 44.

Decoder 49 uses transmission class number clss and transmission class enable signal ce shown in FIG. 9B and obtains the signal designating the data whose class is received. That is, it decodes the transmission class number clss so that, when the data of class 0 is received, the received transmission class number clss is decoded and the signals to the class control $PRIM_{13}MCOMM$ 43 and 44 are formed so that the class number is incremented by 1, as shown in FIG. 2A. This decoded signal is then output to respective class control modules $PRIM_{13}MCOMM_{13}F$ 43 and 44 as receiving enable signal $rve_{13}e$. This signal is used to increment counter 55 by 1 to manage the number of data in the buffer.

Sending and receiving class control module $SP_{13}PSRU$ shown in FIG. 15 receives the data from the west node. The module of sending and receiving class control $SR_{13}PSRU$ (not shown) for receiving the data from the east side node has the same structure as the above recited module for the west side. Decoder 50 (not shown) provided in the module of sending and receiving class control uses an empty class number eclss and an empty class enable signal ece transmitted from the east side node and forms the signal $erve_{13}e$ for designating the class in the buffer for which the east side node becomes empty. Signal $erve_{13}e$ enters the module of class control 43 and 44 of sending and receiving class control module $SR_{13}PSRU(east)$ 18 as the signal $erve_{13}e$ in FIG. 15, and class control modules 43 and 44 detect whether or not the corresponding class in the buffer in the east side node is empty. That is, when the buffer of the east side node is not empty, counter 56 in the module of class control 43 and 44 is set to "1" in the full state by using the signal $fulli_{13}e$ designating the full state When the receiving enable signal $evre_{13}e$ is transmitted from sending and receiving class control module $SR_{13}PSRU(west)$ 19 state 1 is changed to state 0, i.e., the state in which the corresponding buffer class of the adjacent east node becomes empty. The empty class has the class number obtained by increasing the transmission class number to the east side of the originating node by 1. Therefore, the class of the buffer in the originating node transfers the data to the corresponding empty class of the adjacent node of the east side or the data from the adjacent node on the west side is relayed by the originating node and transmitted to the empty class of the buffer in the east side node.

Further, when the data is transferred from the east side node to the west side node, decoder DECODE 50 forms empty class receiving signal erve$_{13}$w for designating which class in the buffer in the west side node is empty by using empty class number eclss and empty class enable signal ece transmitted from the west side node. It then outputs the empty class receiving signal erve$_{13}$w to module of transmission and receiving class control, SR$_{13}$PSRU19 shown in FIG. 11, to control the data output class to the west side node in the originating node.

The module of sending control MSEND46 comprises two priority encoders PRIORITY ENCODE 51 and 52. Priority encoder 51 receives from the module of the respective class control PRIM$_{13}$MCOMM 43 and 44 data sending request signal DA$_{13}$e which is sent to the adjacent node and selects the highest class sending request signal. The highest class is determined at the transmission class number clss in FIG. 9B and a signal designating the highest class is returned to respective module of class control PRIM$_{13}$MCOMM 43 and 44 as acknowledge signals sde$_{13}$e for confirming that data is sent to the east side node. Therefore, counter 55 provided in class control module 43 and 44 is decremented by 1.

Sending and receiving control module SR$_{13}$PSRU(west) 19 provided for the data received from the east side node includes priority encoder (52) (not shown). Priority encoder (52) is provided corresponding to the priority encoder 52 shown in FIG. 15 and in the module of sending and receiving control (west) 19. An empty class sending request signal em$_{13}$w is formed by class control module 43 and 44 of the sending and receiving control module 18 shown in FIG. 15 when the memory, namely, buffer memory 16 shown in FIG. 11, for storing the data transmitted from the west side node the originating node becomes empty. This signal is used to input the empty class sending request signal em$_{13}$e to priority encoder 52 in the module of sending and receiving class control SR$_{13}$PSRU(west) 19. When encoder 52 selects the highest class signal by using the empty sending request signal em$_{13}$e, the empty class number clss shown in FIG. 9B is formed and empty class transmitting acknowledge signal esde$_{13}$e (corresponding to the shown empty class sending acknowledge signal esde$_{13}$w) for confirming that the empty signal was sent to the west node is produced from the priority encoder (52) (not shown). The empty class sending acknowledge signal esde$_{13}$e is transferred to modules of class control 43 and 44 in FIG. 15, thereby resetting counter 55 for managing the number of data in the buffer, as the empty class means that the number of data is 0.

Priority encoder 52 provided in module of sending and receiving class control SR$_{13}$PSRU 18 uses empty class transmission request em$_{13}$w formed by transmission received class control module SR$_{13}$PSRU 19 based on the empty state of buffer memory 17 in FIG. 11, namely, the memory for storing data transmitted from the east side not in the originating node, and selects the highest empty class. It thereby forms the empty class number ecls shown in FIG. 9B and simultaneously outputs the empty class sending acknowledge signal esde$_{13}$w to the east side node of the module of transmission receiving class control SR$_{13}$PSRU 19.

Further, signals from respective class control modules PRIM$_{13}$MCOMM 43 and 44 to the module of output control MOUT 14 for controlling the data output to input and output buffer MIO11, namely, to the originating processor side or to the south or north direction, in FIG. 10, as signal DB$_{13}$e. Then output control module 14 and sending acknowledge signal psde$_{13}$e designating the highest input class are selected from among data sending request signals DB$_{13}$e appearing on 17 signal lines to respective class control modules PRIM$_{13}$MCOMM 43 and 44. Therefore, counter 55 for managing the number of data of the buffer in the originating node is incremented by 1. Further, respective class control modules PRIM$_{13}$MCOMM 43 and 44 receive transmission buffer full signals designating that the buffer at the east side node is full. Thereby, counter 56 for designating that the buffer is full is set to "1".

The module of the sending control MSEND 46 transmits the distance data dis$_{13}$e which is decremented by decrementer 47 in receiving control module MRECV 42, the sending class number and the empty class number as class information to the east side node through output class information bus datas$_{13}$c$_{13}$e34.

Figure 16:
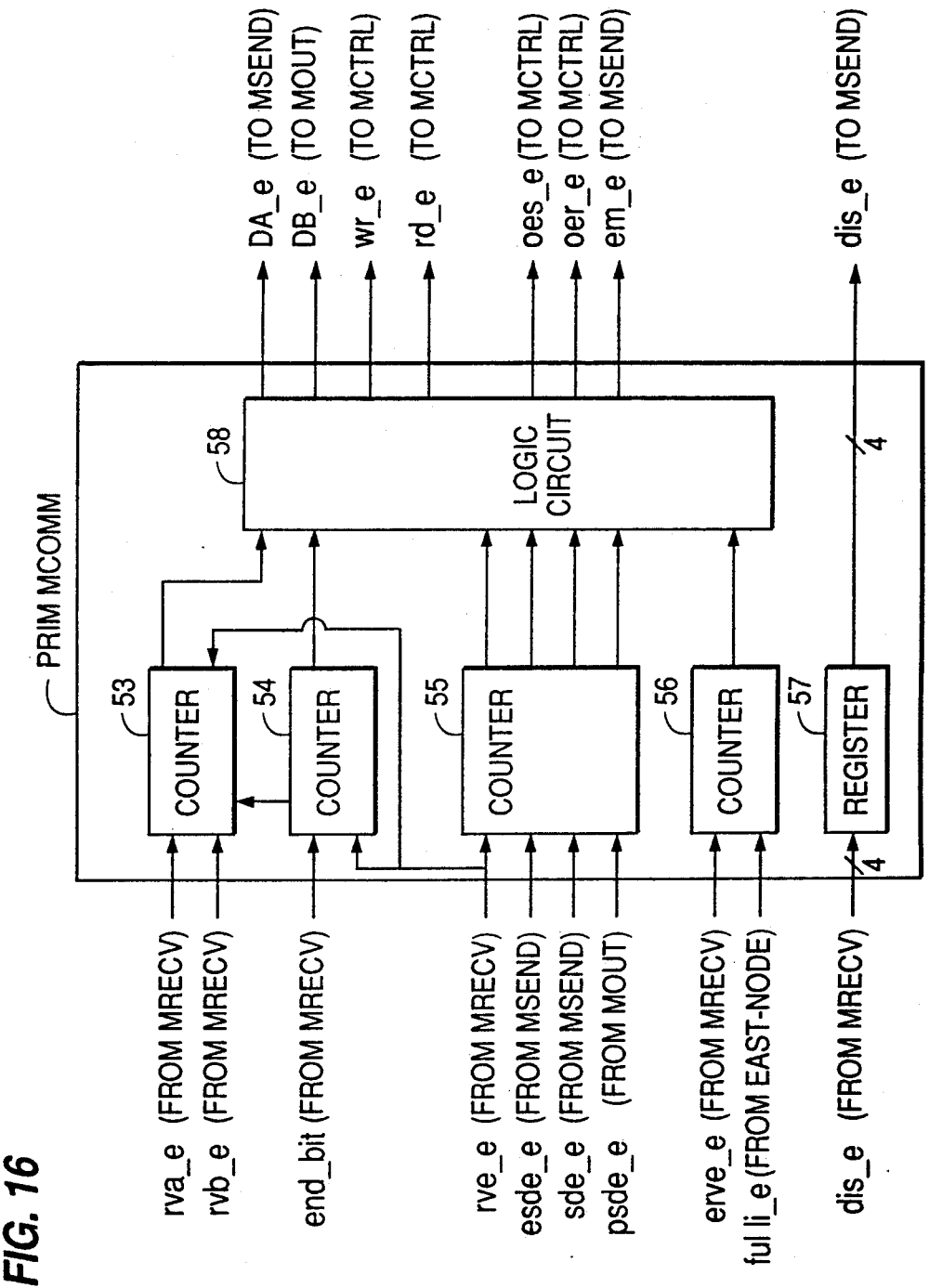
FIG. 16 is a block diagram showing the structure of class control module $PRIM_{13}MCOMM$.

FIG. 16 is a block diagram showing the structure of module of class control PRIM$_{13}$MCOMM 44a. It shows the module of class control other than module of 0 class control PRIM$_{13}$MCOMM$_{13}$F. The module of class control shown here comprises counters 53, 54, 55 and 56, register 57 and logic circuit 58.

East direction enable signal rve$_{13}$e from module of receiving control MRECV 42 and originating processor (MIO) direction enable signal rvb$_{13}$e are input to counter 53, which designates the direction of the data in the corresponding class in the buffer. Receiving enable signal rve$_{13}$e for designating the class to which the data is sent is received by counter 53. Counter 54 receives an end bit signal and a receiving enable signal rve$_{13}$e from receiving control module 42 and determines an end bit designating, for example, the final data flit of the message, and detects the initial flit of the next message, namely, the head flit. Counter 55 receives receiving enable signal rve$_{13}$e from receiving control module MRECV 42, a transmission acknowledge signal esde$_{13}$e for designating an empty class number transmitted to the west side node and transmitted from sending control module MSEND within the module of the sending and receiving class control SR$_{13}$PSRU19, a sending acknowledge signal esde$_{13}$e for designating the class of the data to be output to the west side node, and sending acknowledge signal psde$_{13}$e for designating the class of the data output to the originating processor (MIO11). Then, counter 55 manages the number of data in the corresponding class of the buffer. As recited above, respective buffers can store two of the data.

Counter 56 receives empty class receiving signal erve$_{13}$e for designating the buffer empty class in the east side node. This signal is then transmitted from the module of the receiving control MRECV in sending and receiving class control module SR$_{13}$PSRU 19 and the buffer full signal fulli$_{13}$e is transmitted from the east side node. Counter 56 then shows whether or not the corresponding buffer in the east side node is full. Register 57 stores distance data dis$_{13}$e decremented by decrementer DECR47 in receiving control module MRECV 42 and outputs the distance data dis$_{13}$e to transmission control module 46.

As recited above, the distance data dis$_{13}$e is decremented and the data is thus routed within the network.

The node distance dis is significant only for the header flit. The node for receiving a header flit corresponding to class A from the west side node performs a further routing of the flit to the east side node if the node distance dis is not 0. If the node distance dis is 0, the flit is not subjected to a routing to the east side node, but to a node in the south or north direction or to the originating node.

The direction of the message corresponding to class A of the buffer of the node is kept the same until the end of the message, i.e., until the end bit is detected. Accordingly, the transmission direction of the following data flit in class A is determined by the value of the node distance dis maintained in register 57 as the transfer direction information of class A and the content of the register is updated only when the header flit is received. The direction of a message corresponding to a class other than class A in the buffer of the node is completely independently controlled based on the value of the node distance dis.

Logic circuit 58 of FIG. 16 uses the input from counters 53, 54, 55 and 56 and outputs a west-side node transmission request signal $DA_{13}e$ to sending control module MSEND 46. It also outputs a data transmission request signal for input and output buffer module MIO 11 to output control module MOUT14 Logic circuit 58 outputs write request $wr_{13}e$ and read request $rd_{13}e$ to memory control module MCTRL 45 and comprises the lower 1 bit address of the buffer for performing a write and read of data $oes_{13}e$, and $oer_{13}e$. Logic circuit 58 also outputs a west-side node empty class sending request signal $em_{13}e$ to sending control module MSEND within module of sending and receiving class control $SR_{13}PSRU$(west) 19 of class control modules $PRIM_{13}$-MCOMM $44_1$ to $44_{16}$.

Class control modules $PRIM_{13}MCOMM$ $44_1$ to $44_{15}$ for managing classes 1 to 15 perform exactly the same operation, but class control module $PRIM_{13}MCOMM$ $44_{16}$ for managing class 16 is different from the other modules in that the data sending request is not sent to sending control module MSEND 46 as the data corresponding to class 16 is addressed to the originating node.

Figure 17:
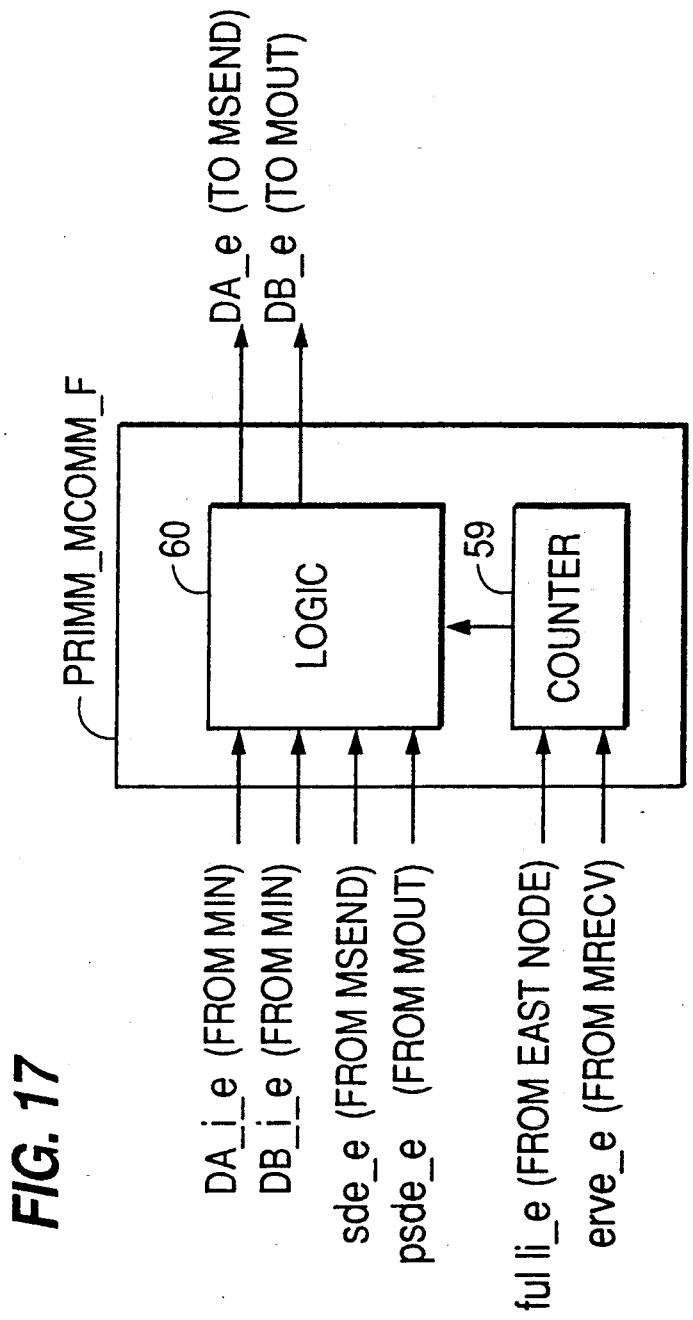
FIG. 17 is a block diagram showing the structure of the 0 class control module $PRIM_{13}MCOMM_{13}F$.

FIG. 17 is a structural block diagram of 0 class control module $PRIM_{13}MCOMM_{13}F$ 43. The operation is almost the same as that of class control module 44 for managing classes 1 to 16, differing only in that it does not manage the buffer. However, it manages the data transmitted to the processor of the originating node. Counter 59 designates whether or not the buffer in the east side node is full, in the same way as counter 56 shown in FIG. 16.

Logic circuit 60 receives signals $DA_{13}i_{13}e$, $DB_{13}i_{13}e$ designating a data sending request for adjacent nodes and input and output buffer MIO11 from input control module MIN12. Logic circuit 60 further receives a transmission acknowledge signal $sde_{13}e$ transmitted from priority encoder 51 in sending control module MSEND46 to the west side node and receives the data to input and output buffer module MIO 11 input from output control module MOUT 14. Logic circuit 60 outputs an east-side-node sending request signal $DB_{13}e$ to sending control module MSEND 46 and transmits MIO11 side sending request signal $DB_{13}e$ to output control module MOUT 14.

Figure 18A:
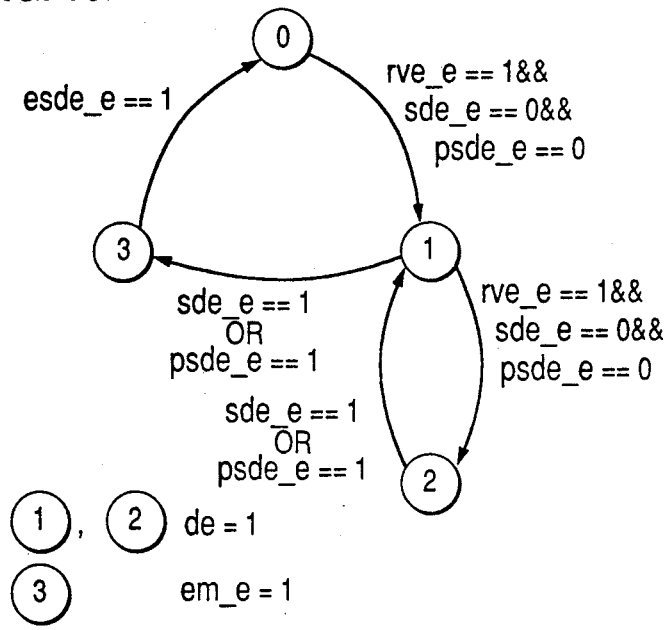

FIG. 18 shows the relation between a state transition of a counter in class control module $PRIM_{13}MCOMM$ and a signal. Signals de, da, db, fst and full are the signals within the module. $SM_1$ in FIG. 18A shows the state of counter 55 in which the number of data in the buffer is managed. 0 means that the number of data is 0. This state changes to state 1, i.e., the state in which the number of data in the buffer is "1", when a receiving enable signal $rve_{13}e$ equals 1, and both sending acknowledge signals, i.e., both $sde_{13}e$ and $psed_{13}e$ for the classes respectively outputted to the east side node and to input and output buffer module MIO11 are "0".

In state 1, the condition recited above is established. State 1 is then changed to state 2, i.e., the state in which the number of data in the buffer is 2. State 2 is changed back to state 1 when sending acknowledge signal $sde_{13}e$ for the class outputted to the east side node or sending acknowledge signal $psed_{13}e$ for the class is outputted to input and output buffer MIO11 becomes 1.

Under the same conditions, state 1 is changed to state 3, namely, the state in which the buffer becomes empty. State 3 changes to state 0 when empty class sending acknowledge signal $esde_{13}e$ to the west side node becomes 1. The signals corresponding to these four states become de=1 for states 1 and 2 and the empty class sending request signal for west side becomes $em_{13}e=1$ for state 3.

Figure 18B:
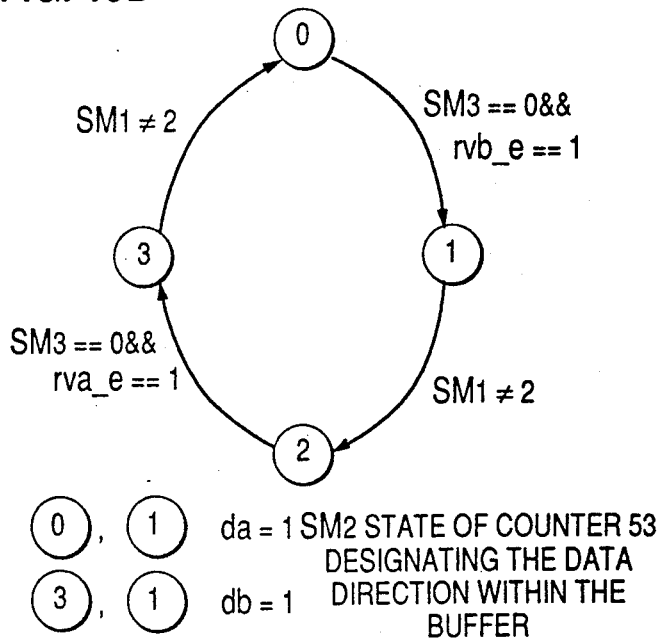

$SM_2$ of FIG. 18B designates a direction of data within the buffer, i.e., the state of counter 53, and there is a possibility that 2 data in the buffer have different directions. Thus, the state becomes 0 to 3. When the state is 0 or 1, da=1 which designates the adjacent node direction. When states are 2 and 3, db=1, which designates the direction of input and output buffer MIO11 as described later. $SM_3=0$ indicates that the data is header data and when it is to be transmitted to input and output buffer MIO 11 side ($rvb_{13}e=1$), state 0 changes to state 1.

The change condition from states 1 to 2 is $SM_1 \neq 2$. This means that the member of the data within the buffer is not 2, but either 1 or 0. When $SM_1=2$, the directions of the 2 data in the buffer may be different. For example, suppose that data previously received in the buffer is in the "a" direction, i.e., in the direction of the east side node. (In this case, the state of $SM_2$ is 0, and a da=1 signal is output.) Thereafter, when the data which is in the "b" direction, i.e., in the direction of the originating processor (MIO11) is received, the data is stored in the buffer and $SM_2$ becomes 1. However, when the previous data is in the buffer, $SM_1$ is 2, the signal da is "1" and db is maintained as "0". When the previously received data is output from the buffer, $SM_1$ is in state 1 and $SM_2$ changes to state 2, thereby outputting the signal db=1. Thus, the data received first is always outputted first.

When the data is header data, as $SM_3=0$ again, and when the data is for the east side node ($rva_{13}e=1$), the state 2 is changed to 3. The transition condition from state 3 to state 0 is $SM_1 \neq 2$, i.e., in the same manner as the change condition from state 1 to state 2.

FIG. 18C is a state transition diagram for explaining state $SM_3$ of counter 54, how it is determined, and whether or not the data is header data. State 0 indicates that the data is header data. State 0 is changed to state 1 (in which the data is not header data) when a received enable signal $rve_{13}e$ becomes "1" When it is detected that the end bit is "1", state 1 is changed to state 0. The signal corresponding to state 0 is fst=1, and the signal corresponding to the state 1 is fst=0.

FIG. 18D is a diagram of change of state $SM_4$ of counter 56 for designating whether or not the buffer in the adjacent node is full. State 0 indicates that the buffer is not full. State 0 is changed to state 1, in which the buffer in the adjacent node is full, when the buffer full input full$i_{13}$e is input. Upon receipt of empty class receiving signal erve$_{13}$e, state 1 is changed to state 0. The signals corresponding to states 0 and 1 are respectively full=0 and 1.

Figure 18E:
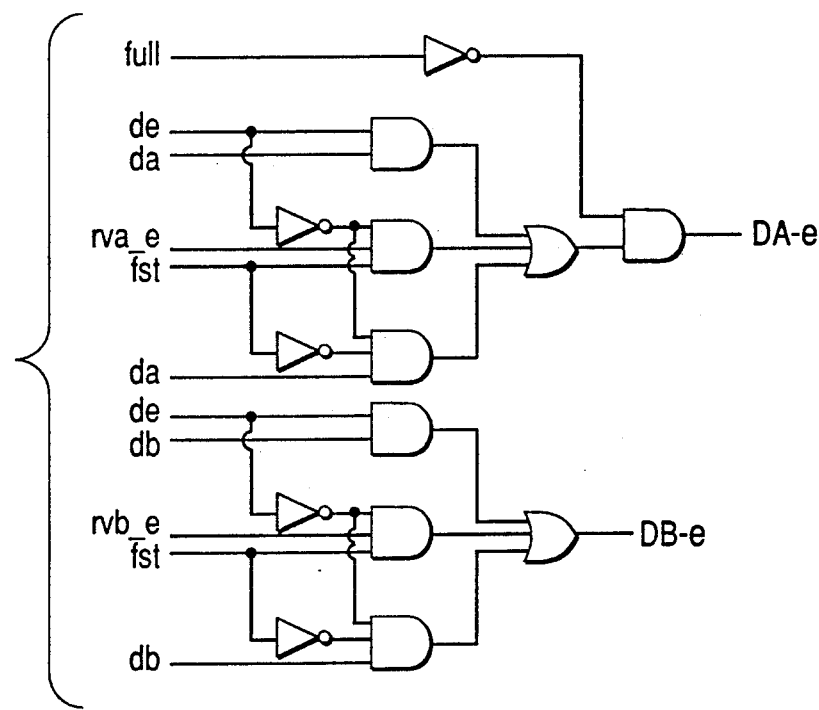
FIG. 18E shows a logic circuit for an output circuit of data output request signals.

FIG. 18E shows the circuit for outputting a data sending request signal for the east side node DA$_{13}$e and data sending request signal DB$_{13}$e for input and output buffer MIO 11. The signal DA$_{13}$e is output by using the above various signals and the east side direction enable signal rva$_{13}$e. The signal DB$_{13}$e is output by using the above recited signals and the originating processor direction enable signal rvb$_{13}$e.

Figure 19:
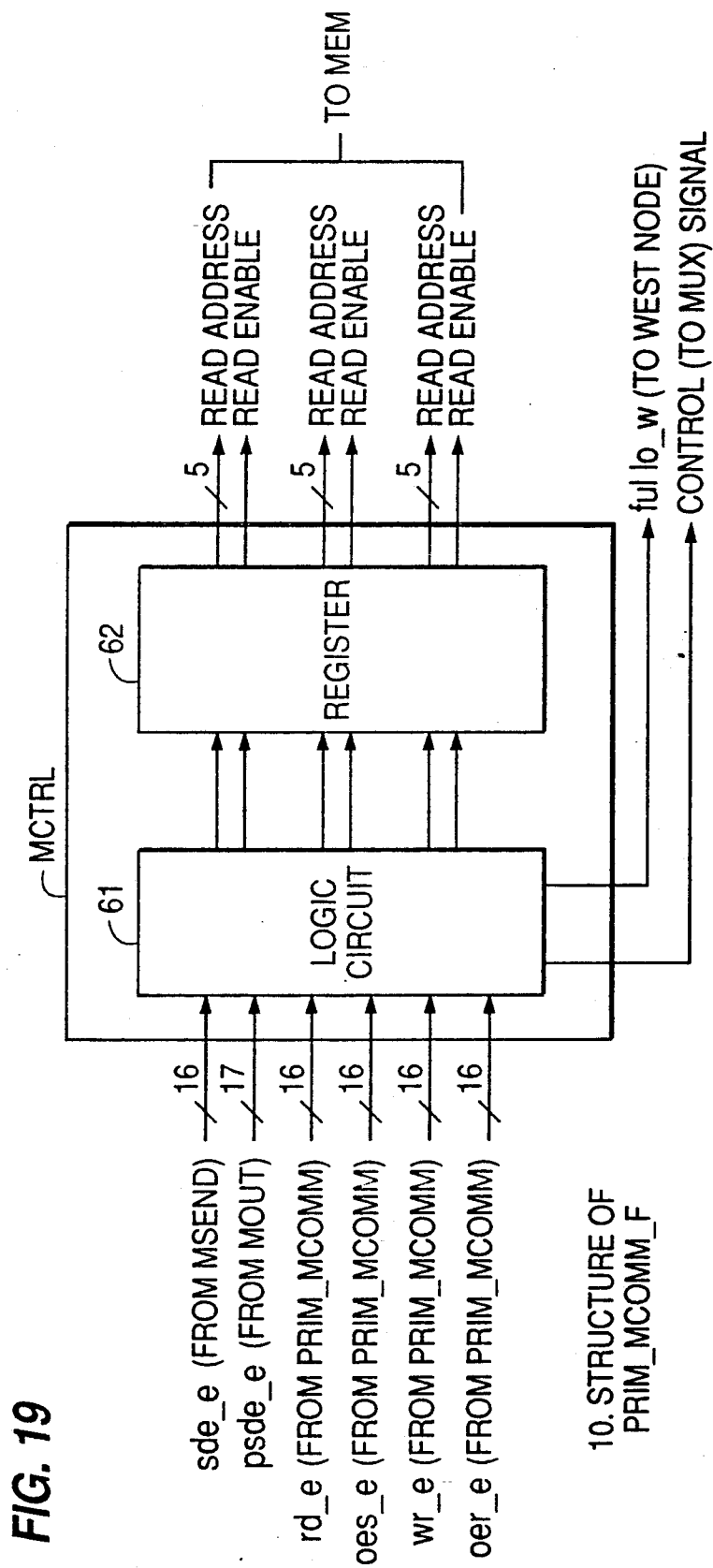
FIG. 19 is a block diagram showing the structure of a memory control module MCTRL.

FIG. 19 is a block diagram showing the structure of memory control module MCTRL 45 used in sending and receiving class control module SR$_{13}$PSRU shown in FIG. 14 and comprises a logic circuit 61 and a register 62. Logic circuit 61 receives east side node sending acknowledge signal sde$_{13}$e transmitted from sending control module MSEND 46, sending acknowledge signal psde$_{13}$e for designating a class of the data to be sent to input and output module MIO 11 and transmitted from output control module MOUT 14, write request signal wr$_{13}$e, read request signal rd$_{13}$e and addresses oes$_{13}$e and oer$_{13}$e designated by the lower 1 bit (total 5 bits) of the buffer. Logic circuit 61 outputs data to the west side node. This signal becomes "1" when the data write signal for the buffer of the originating node is produced. Further, logic circuit 61 outputs a control signal other than dir$_{13}$mo to multiplexers 20 and 22 shown in FIG. 11.

Register 62 outputs two read-address/read-enable signal pairs and one write-address/write-enable signal pair to the buffer memory. Two read-address/read-enable signal pairs are output because the memory read is performed twice per clock. One of the clocks is for reading the data to the east side node and the other is for reading the data to the module of input and output buffer MIO 11. The memory read is conducted at sending phase 2 in FIG. 5 and the memory write is conducted at receiving phase 3 of node B in FIG. 8.

Figure 20:
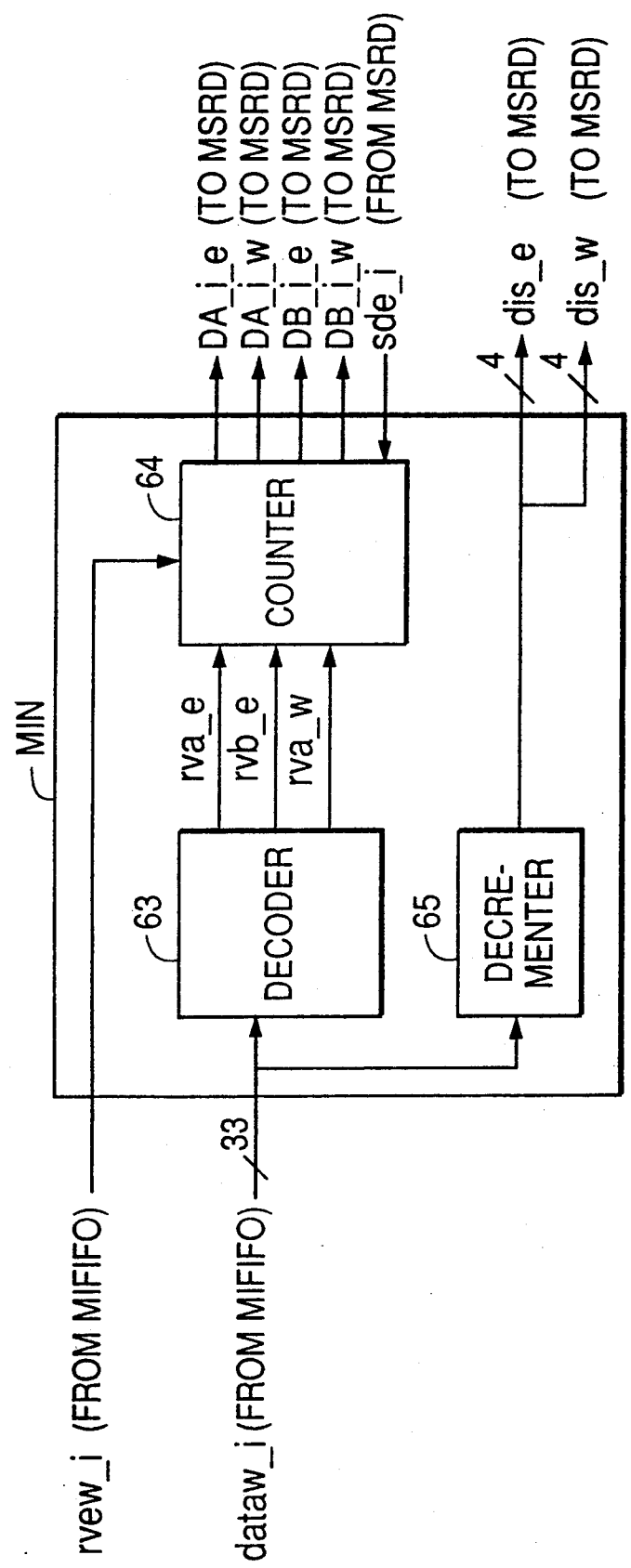
FIG. 20 is a block diagram showing the structure of input control module MIN.

FIG. 20 is a block diagram showing the structure of input control module MIN provided in the routing unit PSRU shown in FIG. 10. Input control module MIN 12 is for determining the sending direction of the data inputted from the originating node processor. The sending direction is the output direction from sending and receiving control device module 6 in FIG. 10 and one of the directions for the east side node, west side node and input and output register module MIO 11. The transmission direction is shown in the header flit as shown in FIG. 4 and the direction of the data is maintained the same from the head of the message, i.e., the header flit to the end bit.

Input control module MIN 12 comprises a decoder 63, a counter 64 and a decrementer 65, as shown in FIG. 20. Decoder 63 and decrementer 65 receive the data from input buffer module MIFIFO 9, shown in FIG. 10, through input data bus dataw$_{13}$i29, and counter 64 receives the signal rvew$_{13}$i designating the existence of data from MIFIF 9.

Decoder 63 determines the direction of the data from the content of the header flit and outputs one of the enable signals rva$_{13}$e, rva$_{13}$w or rvb$_{13}$e, which correspond to the east side node, the west side node and input - output buffer module MIO 11 side, respectively, in respect of the sending direction of the data, to counter 64. Counter 64 outputs to sending and receiving control device module 6, shown in FIG. 10. For one of the signals DA$_{13}$i$_{13}$e, DA$_{13}$i$_{13}$w and DB$_{13}$i$_{13}$e, which correspond to the data transmission request for the east side, the west side and input and output buffer module MIO 11 side, respectively, in FIG. 20, the signal DB$_{13}$i$_{13}$w is always kept b 0. Counter 64 receives an acknowledge signal sde$_{13}$i for designating the sending of the data from sending and receiving control device module 6.

Counter 64 detects the header flit by determining the end bit and maintains the sending direction of the data in accordance with the content of the header flit. Decrementer 65 decrements the information designating the destination node in the header flit, i.e., the distance to the destination node, and outputs it to sending and receiving device module 6 as the distance data dis$_{13}$e (or dis$_{13}$w). The distance is decremented before the data from the processor of the originating node is output to the adjacent node because the number of bits representing this distance is decreased. Thus, the distance data dis shown in FIG. 9B may be 4 bits.

Figure 21:
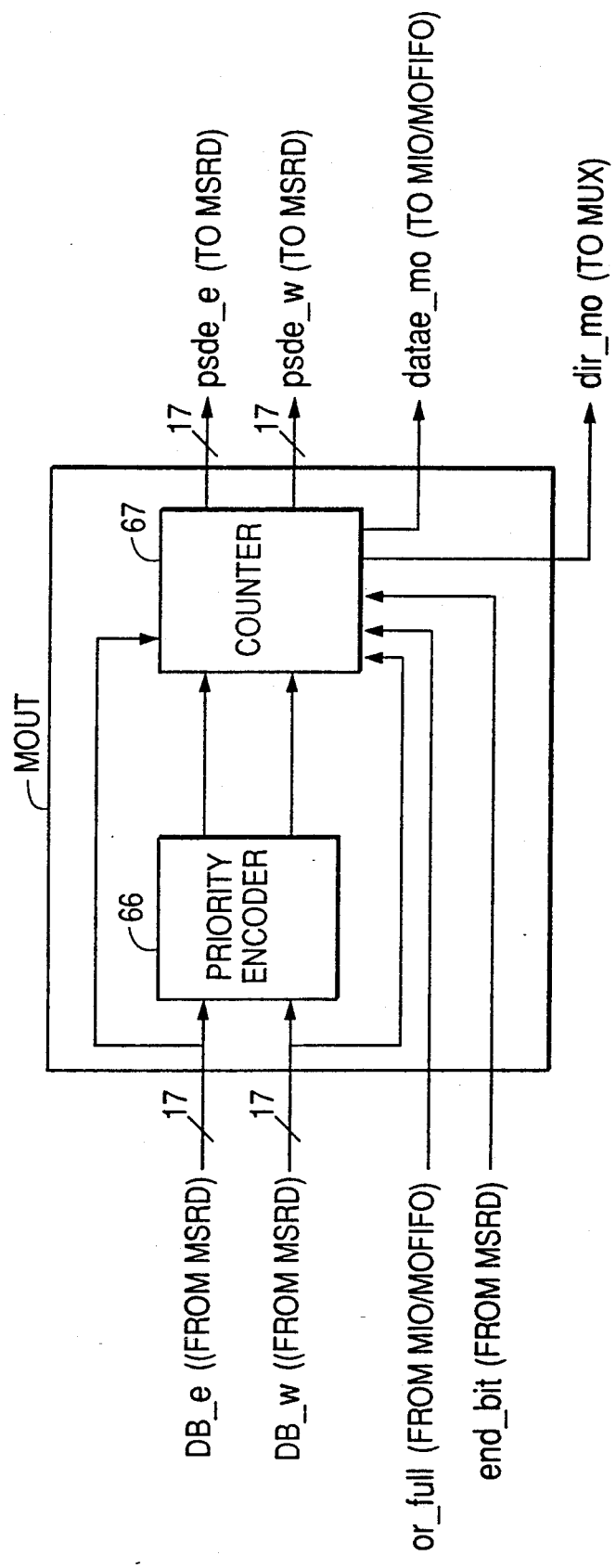
FIG. 21 is a block diagram showing the structure of output control module MOUT.

FIG. 21 is a block diagram showing the structure of output control module MOUT 14. This module is for controlling the data output to the input and output buffer module MIO 11 from sending and receiving control device module 6 and enables the data of the highest of the classes which sending and receiving device module MSRD 6 requests for the output from input and output buffer module MIO 11. The class of the output data is maintained the same from the header flit of the message to the end flit of the message, i.e., the detection of the end bit. Even if higher class data is input to the originating node while the message is being output, the data output of the higher class is not immediately provided and the higher class input data is output after the end bit of the message being output is detected. This control method is performed when the data is output from sending and receiving control data module MSRD 6 to input and output module 11 and a different class (higher class) data output is conducted for every flit when the data is output to sending and receiving control device module 6 to adjacent nodes.

Output control module MOUT 14 comprises priority encoder 66 and counter 67. Priority encoder 66 receives sending request signals DB$_{13}$e and DB$_{13}$w from sending a nd receiving class control module SR$_{13}$PSRU(east)18 and sending and receiving class control module SR$_{13}$PSRU(west)19 of sending and receiving control device module 6, respectively. Counter 67 receives these inputs, signal or$_{13}$full for designating a buffer full state from input and output buffer module MIO 11, the end bit designating the last data flit of the message from sending and receiving control device module 6 and the output of priority encoder 66.

Priority encoder 66 selects the highest class of data sending request signals DB$_{13}$e and DB$_{13}$w and outputs it to counter 67. Counter 67 detects a header flit and maintains the state designating the class of the data to be outputted from sending and receiving control device module 6. At the same time, when counter 67 outputs the signal designating the data output datae$_{13}$mo to input and output buffer module MIO 11, sending acknowledge signals psde$_{13}$e or psde$_{13}$w for designating the class of data to be sent to input and output buffer module MIO 11 selected by output module MOUT 14, and to sending and receiving control device module 6. The two sending acknowledge signals psde$_{13}$e and psde₁₃w correspond to output requests from sending and receiving class module SR₁₃PSRU 18 and 19 for the east and the west sides, respectively. Counter 67 outputs control signal dir₁₃mo to multiplexer 22 shown in FIG. 11.

Figure 22:
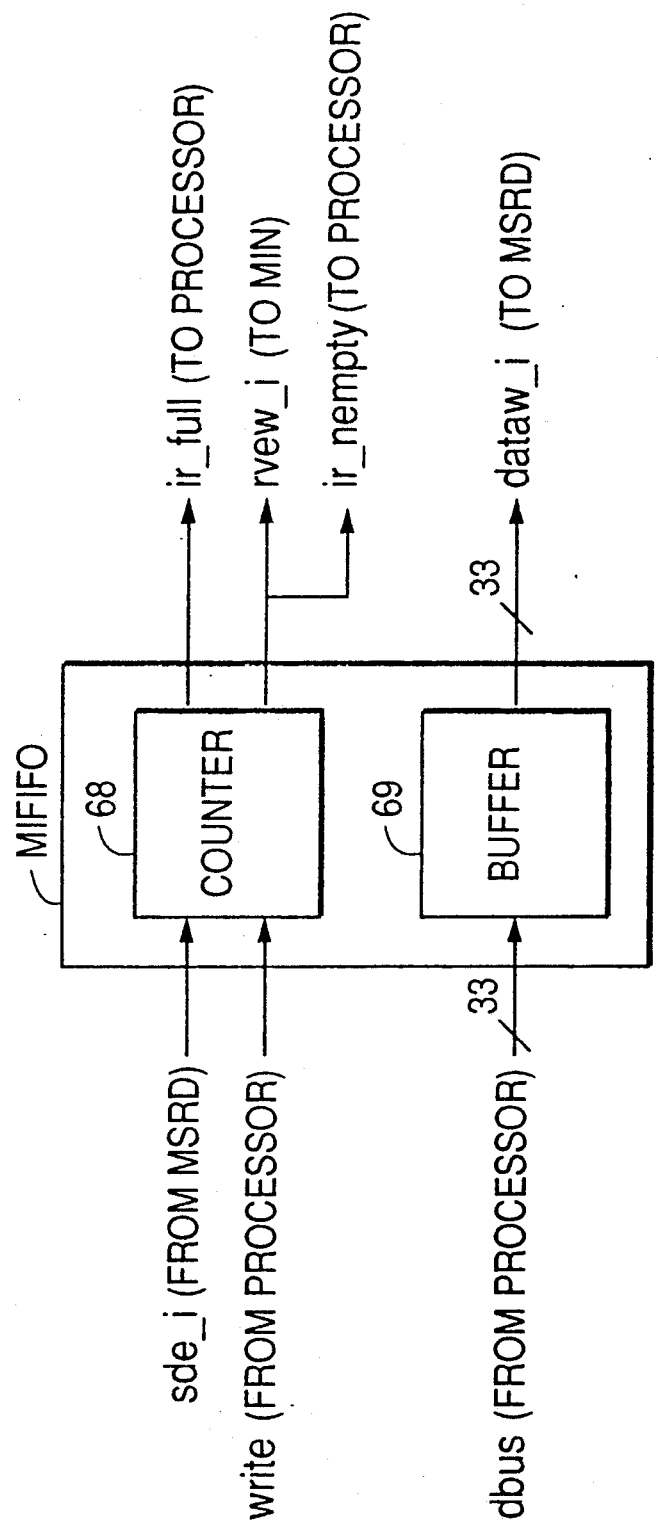
FIG. 22 is a block diagram showing the structure of input buffer module MIFIFO.

FIG. 22 shows a block diagram of FIFO buffer MIFIFO 9 shown in FIG. 10 for storing data to be input from the processor of the originating node. It comprises counter 68 and buffer 69. Buffer 69 temporarily stores the data to be input to the data bus dbus through interface MAD8 from the processor side and outputs it to input data bus dataw₁₃i 29 connected to sending and receiving control module 6.

Counter 68 receives sending acknowledge signal sde₁₃i from sending and receiving control module 6 and write signal write from the processor side and comprises a counter for designating the number of data stored in a buffer, a register for designating the output address of the data and a register for designating the input address to which the next data is input. When signal write becomes "H", and the data is input, the counter value and the input address are incremented, and when the data is output, the output address is incremented and the counter value is decremented.

Counter 68 outputs to the processor side signal rvew₁₃i for designating that data exists in the buffer to the input control module MIN 12. It then transmits to the processor an ir₁₃full signal for designating that the buffer is full or an ir₁₃nempty signal for designating that the buffer is empty.

Figure 23:
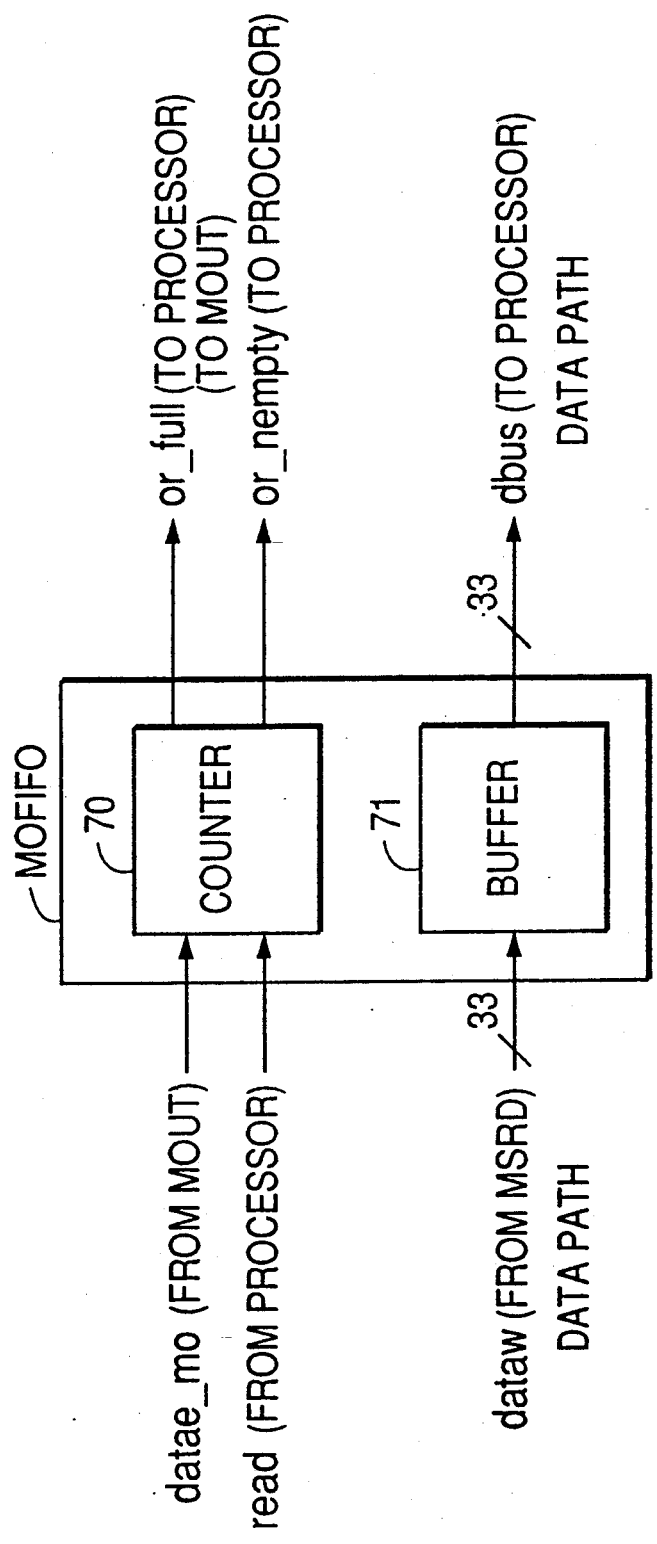
FIG. 23 is a block diagram showing the structure of output buffer module MOFIFO.

FIG. 23 shows a block diagram of output FIFO first-in-first out system buffer module MOFIFO 10 provided at the output side of the processor. Output module MOFIFO 10 comprises counter 70 and buffer 71, as does input module MOFIFO shown in FIG. 22. Buffer 71 temporarily stores data from sending and receiving control module (south/north) 7 in the same manner as buffer 69 and outputs it to the data bus connected to the processor side.

Counter 70 operates in the same way as counter 68 in input first-in-first-out module MIFIFO 9, receives the signal datae₁₃mo outputted from output control module MOUT 15 for designating the data output from sending and receiving control module 7 and read signal read from the processor, and outputs the signal or₁₃full for designating that the buffer is full to output control module MOUT 15 and signal or₁₃nempty and the full signal or₁₃full to the processor side.

Figure 24:
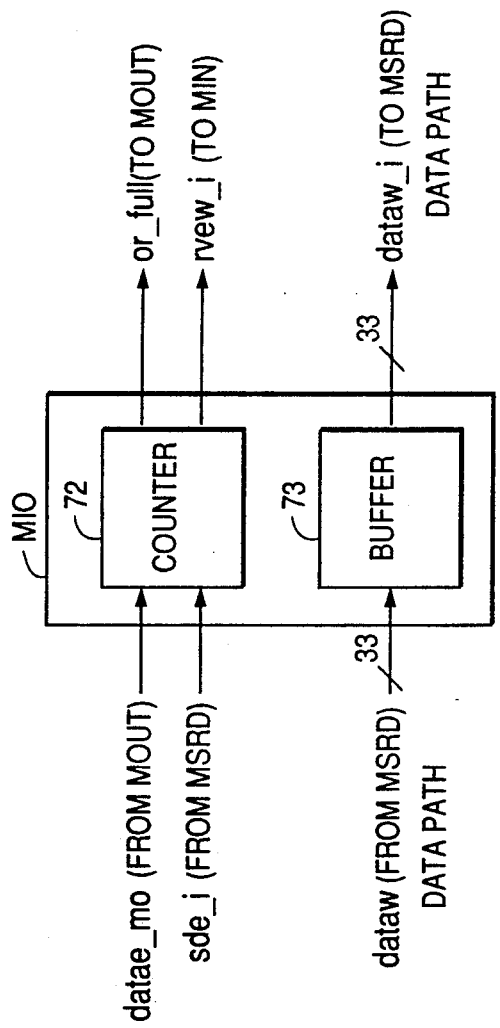
FIG. 24 is a block diagram showing the structure of input and output buffer module MIO.

FIG. 24 is a block diagram showing the structure of the input and output control module 11 shown in FIG. 10. It comprises a data buffer inserted between two sending and receiving control modules MSRD 6 and 7. The input and output buffer module comprises generally available FIFO comprising counter 72 of 1 bit for representing a data enable, and buffer 73. Buffer 73 temporarily stores the data input from the data bus from the input side and outputs it to sending and receiving control module MSRD (south/north)7. Counter 72 receives signal datae₁₃mo designating the data output from output control module MOUT 14 and sending acknowledge signal sde₁₃i from sending and receiving control module 6. Signal or₁₃full designating the buffer full state is input to output control module MOUT 14 and signal rvew₁₃i designating that the data exists in input and output control module MIO, is output to input control module MIN 13.

Figure 25:
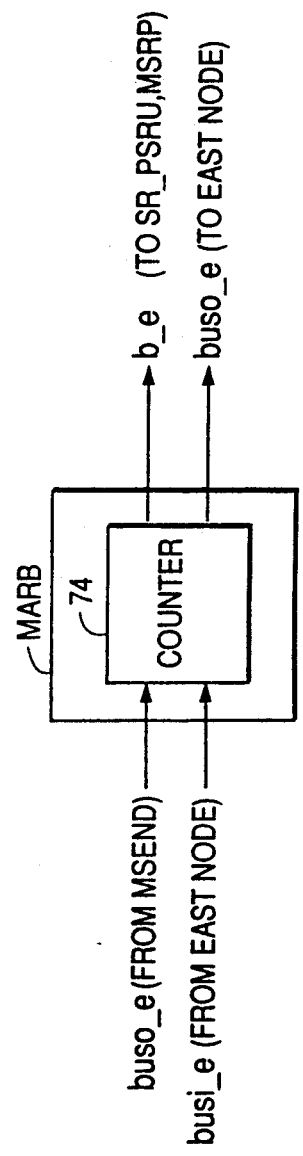
FIG. 25 is a block diagram showing the bus direction control module MIRB. cl DESCRIPTION OF THE EMBODIMENT

FIG. 25 is a block diagram of bus direction control module MARB shown in FIG. 11. It comprises a counter 74 which receives channel obtaining request signal buso₁₃e from sending control module MSEND 46 shown in FIG. 15. The channel obtaining request is output to notify the east side node that the originating node has data to be sent or that the buffer storing the data to be sent from the east side node has become empty, that the OR signal of sending request signal DA₁₃e has been input to sending control module MSEND 46 and sent to the east side node, and that empty class sending request em₁₃w input from sending and receiving class control module SR₁₃PSRU(west)19 has been sent to the east side node.

Counter 74 receives channel obtaining request busi₁₃e from the east side node. It then outputs channel obtaining request buso₁₃e to the east side node and outputs signal b₁₃e designating that the channel is obtained, to register 39 in bus direction switching module MSRP 23 shown in FIG. 13, to receiving control module MRECV 42 shown in FIG. 15, and to sending control module MSEND 46 for controlling sending and receiving class control SR₁₃PSRU.

As explained, according to the present invention, in a network in which a lot of computer nodes are interconnected two-dimensionally by bi-directional channels, the highest class data of the originating data is output from respective nodes to adjacent nodes, thereby effectively utilizing the channel. As recited above, when the output is produced from sending and receiving control module MSRD to the adjacent nodes, the class for producing the data can be changed at every data flit. Even if the message transfer is blocked when the change from the originating node to the east side node is used for a particular message transfer, it becomes possible to use a particular channel to transfer another message. As described above, according to the present invention, in a communication between parallel computers using wormhole routing, a deadlock in communication is avoided and a decrease in transfer capability is prevented, thereby increasing communication speed.

What is claimed is:

1. A communication control system for controlling communication between parallel computers using a wormhole routing, said system comprising:
   means for connecting a plurality of computer nodes by relay channels within a network to continuously transfer a message divided into a plurality of minimum data units for transmission; and
   storing means provided in respective ones of said computer nodes for storing said minimum data units, a number of said storing means corresponding to a number of said relay channels from an originating node to a most remote node,
   whereby a deadlock in communication is avoided, a throughput in said network is improved and a high speed communication is realized.

2. A communication control system according to claim 1, wherein
   said number of said storing means is equal to the number of said relay channels from the originating node to the most remote node plus 1.

3. A communication control system for controlling communication between parallel computers comprising:
   means for connecting a plurality of computer nodes by relay channels within a network to continuously transfer a message divided into a plurality of minimum data units for transmission; and storing means provided in respective ones of said computer nodes for storing said minimum data units, a number of said storing means being equal to a number of said relay channels from an originating node to a most remote node plus 1, said storing means being divided into a plurality of class number regions with a class number of zero for storing said transfer minimum unit data which starts a transfer from the originating node and regions with respective class numbers 1, 2 . . . n for storing the transfer minimum unit data transferred from a message transfer source node to the originating node through respective 1, 2 . . . n relay channels, and when data to be transferred to adjacent nodes exist in said plurality of class number regions, data in one of said plurality of class number regions is transferred to the adjacent node.

4. A communication control system according to claim 2 wherein, empty class information is determined based on the classes in which data does not exist in the adjacent node.

5. A communication control system according to claim 4 wherein data is sent from the class having the highest priority class number selected from among the classes in which data exists in the originating node to an empty class based on said empty class information.

6. A communication control system according to claim 1, wherein
said number of said storing means is equal to the number of said relay channels, n, plus 1.

7. A communication control system according to claim 1, wherein:
said storing means has buffer regions corresponding to a plurality of classes, and the data transmitted from a sending node is stored in one of said buffer regions of the originating node when one of said buffer regions corresponding to a request sending class in said sending node is empty.

8. A communication control system according to claim 1, further comprising:
means for determining a transmission class;
means for transmitting class information; and
means for transmitting transmission class data.

9. A communication control system according to claim 3, wherein
transmission class data corresponding to an empty class is transferred by using empty class information transmitted from the adjacent node.

10. A communication control system according to claim 7, further comprising a sending and receiving class control module including receiving control means, said receiving control means comprising:
means for receiving input information from a node, said receiving control means decrements relative distance information and outputs the relative distance to a destination node, comprising:
means for comparing said distance information with a reference distance (0) to detect whether the determination of the transmission data is made by the originating node;
first decoding means for decoding the transmission class; and
second decoding means for decoding the empty information.

11. A communication control system according to claim 10, wherein a class control module is provided corresponding to respective class information, comprising:
first counting means for managing the number of data in said buffer regions within the originating node,
second counting means for designating the direction of the data in said buffer regions;
third counting means for designating whether the data is header data;
fourth counting means for designating whether or not corresponding buffer regions within the adjacent node is full; and
a logic circuit connected to said first to fourth counting means for outputting the data output request signal of the data to be transmitted to an adjacent node, a transmission acknowledge signal for confirming that the data has been sent, and a signal from said sending and receiving control module designating whether the class corresponding to said buffer regions in the adjacent node is empty, thereby changing the state of the counter.

12. A communication control system according to claim 11, further comprising a plurality of sending and receiving control modules, wherein said sending portion of said sending and receiving control modules comprises:
a first priority encoder, operatively connected to said class control module, for determining the transmission class by receiving a sending request signal from said class control module;
a second priority encoder, operatively connected to said class control module, for obtaining information designating an empty state of said buffer regions of an adjacent node transmitted through said sending and receiving class control module within the originating node, for using the information designating an empty state of said buffer regions of the adjacent node, and for forming a signal designating said buffer regions of the class corresponding to said class control module: a first one of said plurality sending and receiving control modules for transmitting the data from a first node to a second node; and a second one of said plurality of sending and receiving control modules for controlling the data transfer from said second node to said first node, wherein,
by using said first sending and receiving control module and said second sending and receiving control module, empty class information of said buffer regions of the input data is input to said first sending and receiving control module and is transmitted to said second sending and receiving control module, the empty class information received from the the first node and input to said second sending and receiving control module enables one of said first through fourth counters for designating whether the class of said buffer regions in the adjacent node is full and is provided in said class control module corresponding to respective classes, and the transmission sending class information stored in the input data from the adjacent node is utilized.

* * * * *

UNITED STATES PATENT AND TRADEMARK OFFICE
CERTIFICATE OF CORRECTION

PATENT NO. : 5,157,692

DATED : OCTOBER 20, 1992

INVENTOR(S) : Takeshi HORIE et al.

It is certified that error appears in the above-identified patent and that said Letters Patent is hereby corrected as shown below:

Col. 1, line 57, "④]" should be --④--.

Col. 2, line 10, "③" should be --③,--.

Col. 4, line 16, "$SR_{13}PSRU$," should be --SR_PSRU,--;
line 19, "$SR_{13}PSRU$," should be --SR_PSRU,--;
line 21, "$PRIM_{13}MCOMM$," should be --PRIM_MCOMM,--;
line 23, "$PRIM_{13}MCOMM_{13}F$," should be --PRIM_MCOMM_F,--;
line 26, "$PRIM_{13}$" should be --PRIM_--;
line 44, "cl DESCRIPTION OF THE" should be deleted;
line 45, "EMBODIMENT" should be --DESCRIPTION OF THE EMBODIMENT--.

Col. 6, line 13, "yrcid = )_" should be --yrcid = 2--;
line 27, "north south" should be --north-south--.

Col. 8, line 55, "$SR_{13}PSRU$" should be --SR_PSRU--.

Col. 9, line 27, "$dataw_{13}29$" should be --dataw_i 29--;
line 30, "$datas_{13}d_{13}e\ 30$" should be --datas_d_e 30--;
line 32, "$buf_{13}e\ 31.$" should be --buf_e 31.--;
line 38, "$buf_{13}w\ 32.$" should be --buf_w 32.--;
line 40, "$SR_{13}PSRU$" should be --SR_PSRU--;

UNITED STATES PATENT AND TRADEMARK OFFICE
CERTIFICATE OF CORRECTION

PATENT NO. : 5,157,692

DATED : OCTOBER 20, 1992

INVENTOR(S) : Takeshi HORIE et al.

It is certified that error appears in the above-identified patent and that said Letters Patent is hereby corrected as shown below:

```
Col.  9,   line 40,   "SR₁₃PSRU"     should be  --SR_PSRU--;
           line 41,   "datarw₁₃e"    should be  --datarw_e--;
           line 46,   "SR₁₃PSRU"     should be  --SR_PSRU--.

Col. 10,   line  1,   "SR₁₃PSRU"     should be  --SR_PSRU--;
           line  2,   "datas₁₃c₁₃e"  should be  --datas_c_e--;
           line  6,   "buf₁₃e 31."   should be  --buf_e 31.--;
           line  8,   "SR₁₃PSRU"     should be  --SR_PSRU--;
           line 12,   "SR₁₃PSRU"     should be  --SR_PSRU--;
           line 13,   "fulli₁₃e"     should be  --fulli_e--;
           line 18,   "buf₁₃e 31,"   should be  --buf_e 31,--;
           line 20,   "buso₁₃e"      should be  --buso_e--;
           line 20,   "busi₁₃e"      should be  --busi_e--;
           line 22,   "buf₁₃e"       should be  --buf_e--;
           line 32,   "dir₁₃mo"      should be  --dir_mo--;
           line 36,   "SR₁₃PSRU"     should be  --SR_PSRU--;
           line 40,   "buf₁₃e"       should be  --buf_e--;
           line 43,   "datas₁₃d₁₃e"  should be  --datas_d_e--;
           line 44,   "datas₁₃c₁₃e"  should be  --datas_c_e--;
           line 45,   "SR₁₃PSRU"     should be  --SR_PSRU--;
           line 48,   "buf₁₃e"       should be  --buf_e--;
           line 49,   "b₁₃e"         should be  --b_e--;
           line 50,   "pb₁₃e"        should be  --pb_e--;
           line 52,   "b₁₃e"         should be  --b_e--;
           line 54,   "buf₁₃e"       should be  --buf_e--;
           line 57,   "SR₁₃PSRU."    should be  --SR_PSRU.--;
           line 62,   "SR₁₃PSRU"     should be  --SR_PSRU--;
           line 64,   "SR₁₃PSRU"     should be  --SR_PSRU--;
           line 66,   "datarw₁₃e"    should be  --datarw_e--;
           line 67,   "PRIM₁₃MCOMM"  should be  --PRIM_MCOMM--.
```

UNITED STATES PATENT AND TRADEMARK OFFICE
CERTIFICATE OF CORRECTION

PATENT NO. : 5,157,692  Page 3 of 9

DATED : OCTOBER 20, 1992

INVENTOR(S) : Takeshi HORIE et al.

It is certified that error appears in the above-identified patent and that said Letters Patent is hereby corrected as shown below:

```
Col. 11,   line  2,  "datas₁₃c₁₃e" should be --datas_c_e--;
           line  3,  "PRIM₁₃MCOMM" should be --PRIM_MCOMM--;
           line  6,  "PRIM₁₃MCOMM₁₃F" should be --PRIM_MCOMM_F--;
           line  8,  "modules PRIM₁₃" should be
                       --modules PRIM_--;
           line 12,  "PRIM₁₃." should be --PRIM_--;
           line 18,  "PRIM₁₃MCOMM" should be --PRIM_MCOMM--;
           line 22,  "PRIM₁₃MCOMM₁₃FO to PRIM₁₃." should be
                       --PRIM_MCOMM_FO to PRIM_--;
           line 23,  "MCOMM₁₃F" should be --MCOMM_F--;
           line 29,  "SR₁₃PSRU" should be --SR_PSRU--;
           line 33,  "SR₁₃PSRU" should be --SR_PSRU--;
           line 48,  "PRIM₁₃." should be --PRIM_--;
           line 49,  "MCOMM₁₃F" should be --MCOMM_F--;
           line 61,  "SR₁₃PSRU," should be --SR_PSRU,--;
           line 62,  "PRIM₁₃MCOMM" should be --PRIM_MCOMM--;
           line 68,  "datarw₁₃e 33." should be --datarw_e 33.--.

Col. 12,   line  3,  "PRIM₁₃." should be --PRIM_--;
           line 12,  "PRIM₁₃MCOMM" should be --PRIM_MCOMM--;
           line 15,  "rva₁₃e" should be --rva_e--;
           line 16,  "PRIM₁₃MCOMM" should be --PRIM_MCOMM--;
           line 18,  "rvb₁₃e" should be --rvb_e--;
           line 22,  "PRIM₁₃MCOMM" should be --PRIM_MCOMM--;
           line 29,  "PRIM₁₃MCOMM 43" should be --PRIM_MCOMM
                       43--;
           line 33,  "PRIM₁₃MCOMM₁₃F" should be --PRIM_MCOMM_F--;
           line 34,  "rve₁₃e." should be --rve_e.--;
```

UNITED STATES PATENT AND TRADEMARK OFFICE
CERTIFICATE OF CORRECTION

PATENT NO. : 5,157,692

DATED : OCTOBER 20, 1992

INVENTOR(S) : Takeshi HORIE et al.

It is certified that error appears in the above-identified patent and that said Letters Patent is hereby corrected as shown below:

Col. 12, line 39, "SP$_{13}$PSRU" should be --SR_PSRU--;
line 41, "SR$_{13}$PSRU" should be --SR_PSRU--;
line 47, "erve$_{13}$e" should be --erve_e--;
line 49, "erve$_{13}$3" should be --erve_e--;
line 51, "SR$_{13}$PSRU" should be --SR_PSRU--; and "erve$_{13}$e" should be --erve_e--;
line 57, "fulli$_{13}$e" should be --filli_e--;
line 58, "evre$_{13}$e" should be --evre_e--;
line 60, "SR$_{13}$PSRU" should be --SR_PSRU--.

Col. 13, line 5, "erve$_{13}$w" should be --erve_w--;
line 10, "erve$_{13}$w" should be --erve_w--;
line 11, "SR$_{13}$PSRU19" should be --SR_PSRU 19--;
line 17, "PRIM$_{13}$MCOMM" should be --PRIM_MCOMM--;
line 18, "DA$_{13}$e" should be --DA_e--;
line 23, "PRIM$_{13}$MCOMM" should be --PRIM_MCOMM--;
line 24, "sde$_{13}$e" should be --sde_e--;
line 29, "SR$_{13}$PSRU" should be --SR_PSRU--;
line 34, "em$_{13}$w" should be --em_w--;
line 42, "em$_{13}$e" should be --em_e--;
line 44, "SR$_{13}$PSRU" should be --SR_PSRU--;
line 46, "em$_{13}$e," should be --em_e,--;
line 48, "esde$_{13}$e" should be --esde_e--;
line 49, "esde$_{13}$w)" should be --esde_w)--;
line 52, "esde$_{13}$e" should be --esde_e--;
line 58, "SR$_{13}$PSRU" should be --SR_PSRU--;
line 59, "em$_{13}$w" should be --em_w--;
line 60, "SR$_{13}$PSRU" should be --SR_PSRU--;
line 67, "de$_{13}$w" should be --de_w--;
line 68, "SR$_{13}$PSRU" should be --SR_PSRU--.

UNITED STATES PATENT AND TRADEMARK OFFICE
CERTIFICATE OF CORRECTION

PATENT NO. : 5,157,692     Page 5 of 9
DATED : OCTOBER 20, 1992
INVENTOR(S) : Takeshi HORIE et al.

It is certified that error appears in the above-identified patent and that said Letters Patent is hereby corrected as shown below:

Col. 14, line 2, "$PRIM_{13}MCOMM$" should be --PRIM_MCOMM--;
line 6, "$DB_{13}e.$" should be --DB_e.--;
line 7, "$psde_{13}e$" should be --psde_e--;
line 9, "$DB_{13}e$" should be --DB_e--;
line 10, "$PRIM_{13}.$" should be --PRIM_--;
line 14, "$PRIM_{13}MCOMM$" should be --PRIM_MCOMM--;
line 19, "$dis_{13}e$" should be --dis_e--;
line 23, "$datas_{13}c_{13}e34.$" should be --datas_c_e 34.--;
line 25, "$PRIM_{13}MCOMM$" should be --PRIM_MCOMM--;
line 27, "$PRIM_{13}MCOMM_{13}F.$" should be
          --PRIM_MCOMM_F.-;
line 30, "$rve_{13}e$" should be --rve_e--;
line 32, "$rvb_{13}e$" should be --rvb_e--;
line 35, "$rve_{13}e$" should be --rve_e--;
line 37, "$rve_{13}e$" should be --rve_e--;
line 42, "$rve_{13}e$" should be --rve_e--;
line 43, "$esde_{13}e$" should be --esde_e--;
line 47, "$SR_{13}PSRU19,$" should be --SR_PSRU 19,--;
line 48, "$esde_{13}e$" should be --esde_e--;
line 50, "$psde_{13}e$" should be --psde_e--;
line 56, "$erve_{13}e$" should be --erve_e--;
line 59, "$SR_{13}PSRU$" should be --SR_PSRU--;
line 60, "$fulli_{13}e$" should be --fulli_e--;
line 63, "$dis_{13}e$" should be --dis_e--;
line 65, "$dis_{13}e$" should be --dis_e--;
line 67, "$dis_{13}e$" should be --dis_e--.

UNITED STATES PATENT AND TRADEMARK OFFICE
CERTIFICATE OF CORRECTION

PATENT NO. : 5,157,692

DATED : OCTOBER 20, 1992

INVENTOR(S) : Takeshi HORIE et al.

It is certified that error appears in the above-identified patent and that said Letters Patent is hereby corrected as shown below:

Col. 15, line 23, "$DA_{13}e$" should be --DA_e--;
line 27, "$wr_{13}e$" should be --wr_e--; and "$rd_{13}e$" should be --rd_e--;
line 30, "$oes_{13}e$," should be --oes_e,--; and "$oer_{13}e$." should be --oer_e.--;
line 32, "$em_{13}e$" should be --em_e--;
line 34, "$SR_{13}PSRU$" should be --SR_PSRU--; and "$PRIM_{13}$" should be --PRIM_--;
line 36, "$PRIM_{13}MCOMM$" should be --PRIM_MCOMM--;
line 38, "$PRIM_{13}MCOMM$" should be--PRIM_MCOMM--;
line 45, "$PRIM_{13}MCOMM_{13}F\ 43$." should be --PRIM_MCOMM_F 43.--;
line 53, "$DA_{13}i_{13}e,\ DB_{13}i_{13}e$" should be --DA_i_e, DB_i_e--;
line 57, "$sde_{13}e$" should be --sde_e--;
line 62, "$DB_{13}e$" should be --DB_e--;
line 64, "$DB_{13}e$" should be --DB_e--;
line 67, "$PRIM_{13}MCOMM$" should be --PRIM_MCOMM--.

Col. 16, line 6, "$rve_{13}e$" should be --rve_e--;
line 7, "$sde_{13}e$ and $psed_{13}e$" should be --sde_e and psed_e--;
line 13, "$sde_{13}e$" should be --sde_e--;
line 15, "$psed_{13}e$" should be --psed_e--;
line 20, "$esde_{13}e$" should be --esde_e--;
line 23, "$em_{13}e=1$" should be --em_e=1--;
line 34, "$(rvb_{13}e=1)$," should be --(rvb_e=1),--;
line 54, "$(rva_{13}e=1)$," should be --(rva_e=1),--;
line 63, "$rve_{13}e$" should be --rve_e--.

UNITED STATES PATENT AND TRADEMARK OFFICE
CERTIFICATE OF CORRECTION

PATENT NO. : 5,157,692

DATED : OCTOBER 20, 1992

INVENTOR(S) : Takeshi HORIE et al.

It is certified that error appears in the above-identified patent and that said Letters Patent is hereby corrected as shown below:

Col. 17, line 4, "fulli$_{13}$e" should be --fulli_e--;
line 5, "erve$_{13}$e," should be --erve_e,--;
line 9, "DA$_{13}$e" should be --DA_e--;
line 10, "DB$_{13}$e" should be --DB_e--;
line 11, "DA$_{13}$e" should be --DA_e--;
line 13, "rva$_{13}$e." should be --rva_e.--; and "DB$_{13}$e" should be --DB_e--;
line 15, "rvb$_{13}$e." should be --rvb_e.--;
line 18, "SR$_{13}$PSRU" should be --SR_PSRU--;
line 21, "sde$_{13}$e" should be --sde_e--;
line 23, "psde$_{13}$e" should be --psde_e--;
line 26, "wr$_{13}$e," should be --wr_e,--; and "rd$_{13}$e" should be --rd_e--;
line 27, "oes$_{13}$e and oer$_{13}$e" should be --oes_e and oer_e--;
line 33, "dir$_{13}$mo" should be --dir_mo--;
line 61, "dataw$_{13}$i29," should be --dataw_i 29,--;
line 62, "rvew$_{13}$i" should be --rvew_i--;
line 66, "rva$_{13}$e, rva$_{13}$w or rvb$_{13}$e," should be --rva_e, rva_w or rvb_e,--.

Col. 18, line 4, "DA$_{13}$i$_{13}$e, DA$_{13}$i$_{13}$w and DB$_{13}$i$_{13}$e," should be --DA_i_e, DA_i_w and DB_i_e,--;
line 7, "DB$_{13}$i$_{13}$w" should be --DB_i_w--;
line 9, "sde$_{13}$i" should be --sde_i--;
line 17, "dis$_{13}$e" should be --dis_e--;
line 18, "dis$_{13}$w)." should be --dis_w).--;
line 46, "DB$_{13}$e and DB$_{13}$w" should be --DB_e and DB_w--;
line 47, "SR$_{13}$PSRU" should be --SR_PSRU--;

UNITED STATES PATENT AND TRADEMARK OFFICE
CERTIFICATE OF CORRECTION

PATENT NO. : 5,157,692

DATED : OCTOBER 20, 1992

INVENTOR(S) : Takeshi HORI et al.

It is certified that error appears in the above-identified patent and that said Letters Patent is hereby corrected as shown below:

Col. 18, line 49, "$SR_{13}PSRU$" should be --$SR\_PSRU$--;
line 51, "$or_{13}full$" should be --$or\_full$--;
line 57, "$DB_{13}e$ and $DB_{13}w$" should be --$DB\_e$ and $DB\_w$--;
line 62, "$datae_{13}mo$" should be --$datae\_mo$--;
line 64, "$psde_{13}e$ or $psde_{13}w$" should be --$psde\_e$ or $psde\_w$--;
line 68, "$psde_{13}e$" should be --$psde\_e$--.

Col. 19, line 1, "$psde_{13}w$" should be --$psde\_w$--;
line 2, "$SR_{13}PSRU$" should be --$SR\_PSRU$--;
line 4, "$dir_{13}mo$" should be --$dir\_mo$--;
line 12, "$dataw_{13}i$" should be --$dataw\_i$--;
line 15, "$sde_{13}i$" should be --$sde\_i$--;
line 26, "$rvew_{13}i$" should be --$rvew\_i$--;
line 28, "$ir_{13}full$" should be --$ir\_full$--;
line 42, "$datae_{13}mo$" should be --$datae\_mo$--;
line 45, "$or_{13}full$" should be --$or\_full$--;
line 47, "$or_{13}nempty$" should be --$or\_nempty$--;
line 48, "$or_{13}full$" should be --$or\_full$--;
line 59, "$datae_{13}mo$" should be --$datae\_mo$--;
line 61, "$sde_{13}i$" should be --$sde\_i$--;
line 62, "$or_{13}full$" should be --$or\_full$--;
line 64, "$rvew_{13}i$" should be --$rvew\_i$--.

Col. 20, line 2, "$buso_{13}e$" should be --$buso\_e$--;
line 8, "$DA_{13}e$" should be --$DA\_e$--;
line 10, "$em_{13}w$" should be --$em\_w$--;
line 11, "$SR_{13}PSRU$" should be --$SR\_PSRU$--;
line 13, "$busi_{13}e$" should be --$busi\_e$--;

UNITED STATES PATENT AND TRADEMARK OFFICE
CERTIFICATE OF CORRECTION

PATENT NO. : 5,157,692     Page 9 of 9

DATED : OCTOBER 20, 1992

INVENTOR(S) : Takeshi HORIE et al.

It is certified that error appears in the above-identified patent and that said Letters Patent is hereby corrected as shown below:

Col. 20, line 15, "$buso_{13}e$" should be --buso_e--;
            line 16, "$b_{13}e$" should be --b_e--;
            line 21, "$SR_{13}PSRU.$" should be --SR_PSRU.--.

Col. 22, line 41, "module:" should be --module;--; and
                    "a first" should be a new paragraph, with paragraph indentation;
            line 44, "a second" should be a new paragraph, with paragraph indentation.

Signed and Sealed this

Eighth Day of February, 1994

*Attest:*

BRUCE LEHMAN

*Attesting Officer*     *Commissioner of Patents and Trademarks*